(12) United States Patent
Yamada et al.

(10) Patent No.: US 9,063,907 B2
(45) Date of Patent: Jun. 23, 2015

(54) COMPARISON FOR REDUNDANT THREADS

(71) Applicant: Renesas Electronics Corporation, Kawasaki-shi, Kanagawa (JP)

(72) Inventors: Hiromichi Yamada, Hitachi (JP); Nobuyasu Kanekawa, Hitachi (JP); Tsutomu Yamada, Hitachinaka (JP); Kesami Hagiwara, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 172 days.

(21) Appl. No.: 13/796,304

(22) Filed: Mar. 12, 2013

(65) Prior Publication Data
US 2013/0254592 A1    Sep. 26, 2013

(51) Int. Cl.
G06F 11/00    (2006.01)
G06F 11/20    (2006.01)
G06F 9/48     (2006.01)
G06F 11/14    (2006.01)
G06F 21/56    (2013.01)
G06F 11/16    (2006.01)

(52) U.S. Cl.
CPC .......... *G06F 11/2041* (2013.01); *G06F 9/4881* (2013.01); *G06F 11/1497* (2013.01); *G06F 11/1492* (2013.01); *G06F 21/566* (2013.01); *G06F 11/1641* (2013.01); *G06F 11/1691* (2013.01)

(58) Field of Classification Search
None
See application file for complete search history.

(56) References Cited

U.S. PATENT DOCUMENTS

| | | | |
|---|---|---|---|
| 5,193,175 A * | 3/1993 | Cutts et al. | 714/11 |
| 6,854,075 B2 | 2/2005 | Mukherjee et al. | |
| 7,178,005 B1 | 2/2007 | Jordan et al. | |
| 7,444,497 B2 | 10/2008 | Reinhardt et al. | |
| 2001/0034824 A1 * | 10/2001 | Mukherjee et al. | 712/215 |
| 2001/0037448 A1 * | 11/2001 | Mukherjee et al. | 712/244 |
| 2005/0050307 A1 * | 3/2005 | Reinhardt et al. | 712/227 |
| 2005/0154944 A1 * | 7/2005 | Reinhardt et al. | 714/718 |
| 2005/0193283 A1 * | 9/2005 | Reinhardt et al. | 714/48 |
| 2006/0150186 A1 * | 7/2006 | Grayver | 718/102 |
| 2008/0244354 A1 * | 10/2008 | Wu et al. | 714/755 |
| 2009/0172362 A1 | 7/2009 | Shen et al. | |
| 2011/0047364 A1 | 2/2011 | Koju et al. | |

FOREIGN PATENT DOCUMENTS

| | | |
|---|---|---|
| JP | 2007-519101 A | 7/2007 |
| JP | 2011-44078 A | 3/2011 |
| WO | WO 01/84304 A2 | 11/2001 |

OTHER PUBLICATIONS

Reinhardt, et al., "Transient Fault Detection via Simultaneous Multithreading", 2000, ACM.*

(Continued)

*Primary Examiner* — Gabriel Chu
(74) *Attorney, Agent, or Firm* — McGinn IP Law Group, PLLC

(57) ABSTRACT

The present invention provides a semiconductor integrated circuit device realizing improved detection of a failure while suppressing deterioration in performance. In a semiconductor integrated circuit device executing a plurality of threads while switching them synchronously with clocks, registers used for executing the threads are provided for the respective threads. Programs independent of each other and the same program as the threads are executed while being switched. In the case of executing the same program by a plurality of threads, a comparison circuit for comparing results of execution using registers provided in correspondence with the threads is provided.

19 Claims, 18 Drawing Sheets

(56) References Cited

OTHER PUBLICATIONS

Wang et al., "Compiler-Managed Software-based Redundant Multi-threading for Transient Fault Detection", 2007, IEEE.*
European Search Report dated Aug. 14, 2013.
Richard Emmerson et al., IEEE Micro Dec. 1984,"Fault Tolerance Achieved in VLSI", pp. 34-43.
Thomas Kotke et al., Proceedings of the International Conference on Dependable Systems and Networks 2006, IEEE, "A Reconfigurable Generic Dual-Core Architecture",pp. 45-54, Jan. 2006.

* cited by examiner

| REGISTER NAME | BITS | | | | | | | |
|---|---|---|---|---|---|---|---|---|
| | 15,14 | 13,12 | 11,10 | 9,8 | 7,6 | 5,4 | 3,2 | 1,0 |
| TSR | S0 | S1 | S2 | S3 | S4 | S5 | S6 | S7 |

| REGISTER NAME | BITS | | | |
|---|---|---|---|---|
| | 15, 14, 13, 12 | 11, 10, 9, 8 | 7, 6, 5, 4 | 3, 2, 1, 0 |
| TTR | T0 | T1 | T2 | T3 |

BASIC PIPELINE

INSTRUCTION CACHE MISS

MULTI-STEP EXECUTION

MEMORY ACCESS WAIT

COMPARISON FOR REDUNDANT THREADS

CROSS-REFERENCE TO RELATED APPLICATIONS

The disclosure of Japanese Patent Application No. 2012-064785 filed on Mar. 22, 2012 including the specification, drawings and abstract is incorporated herein by reference in its entirety.

BACKGROUND

The present invention relates to a semiconductor integrated circuit device and relates to a technique effectively applied to a microcontroller provided for a system such as a vehicle and controlling the system.

A microprocessor (hereinbelow, also called a microcomputer) is assembled in a system such as a home electric appliance, an AV device, a cellular phone, a vehicle, or an industrial machine together with a memory which stores a program for specifying the operation of the microprocessor and controls the operation of the system. In the case of a vehicle as the system, parts such as a microcomputer for controlling the operation of the system are requested to have high reliability since there is the possibility that a failure in the parts causes an accident of the vehicle. It is also requested to prevent the vehicle from entering a dangerous state in the case where a failure occurs in the parts. The vehicle is provided with not only the memory and the microcomputer but also a sensor, an actuator, and the like as parts for controlling the vehicle. The microcomputer is requested to diagnose not only the presence or absence of a failure in the parts but also a failure in the microcomputer itself.

As a technique of diagnosing a failure in a microcomputer itself, non-patent literature 1 discloses a technique of making a microcomputer perform duplicated operations, making two microcomputers execute the same process, and always comparing results.

Non-patent literature 2 discloses a technique capable of making two microcomputers switch and execute parallel operation and duplication operation. In the non-patent literature 2, when a microcomputer fetches a special instruction (switch instruction), the microcomputer stops the operation and enters a standby state for switching a mode. When two microcomputers enter the standby state, each of the microcomputers starts operation in a new mode. As modes for starting, there are a performance mode and a safety mode. In the performance mode, each of the microcomputers performs the parallel operation, so that the performance improves. On the other hand, in the safety mode, the two microcomputers perform the duplication operations. By comparing results of the operations, a failure diagnosis is performed.

Patent literature 1 discloses a redundant multithread architecture in which results of store instructions executed in two threads are compared.

Patent literature 2 discloses a multithreading system in which a program is executed in two threads and, when contents match, the contents are written in a common memory.

BACKGROUND ART LITERATURE

Patent Literature

Patent Literature 1: Japanese Unexamined Patent Application Publication (Translation of PCT Application) 2007-519101

Patent Literature 2: Japanese Unexamined Patent Application Publication No. 2011-44078

Non-Patent Literature

Non-Patent Literature 1: "Fault Tolerance Achieved in VLSI", IEEE Micro, December, 1984
Non-Patent Literature 2: "A, Reconfigurable General Dual-Core Architecture", International Conference on Dependable Systems and Networks 2006, pp 45 to 54

SUMMARY

In the non-patent literature, the duplicated operation is always performed. Consequently, safety is high but performance is low. In the non-patent literature, before the mode is switched in response to a special instruction, data necessary to execute a program is requested to be loaded in advance, so that improvement in performance is limited.

FIG. 2 in the patent literature 1 is a block diagram of a simultaneous redundant thread architecture. As an embodiment of FIG. 2, an instruction copy queue (230), a source register value queue (240), and a destination register value queue (250) are provided for the system. A value of a reading thread (210) is transferred to a trailing thread (220) via the queues (230, 240, and 250). Since the value is transferred, the trailing thread (220) executes an instruction by using the value transferred via the queues without having a dependent register. Consequently, it becomes difficult to detect a failure in a register for instruction fetching process and a register for instruction execution, and it becomes difficult to detect a common cause failure. That is, even when a failure occurs in the register for instruction fetching process and/or the register for instruction execution, a result of execution of a reading thread and that of execution of the trailing thread are the same, and it is difficult to detect a failure.

In the patent literature 2, in the case where the same program is executed in two threads and results of execution in the threads match, writing to a common memory is performed. A technique of changing a source code of the program to perform the process is disclosed. Specifically, codes for instructing a process of buffering the execution results in a local memory, a process of comparing the buffered results, and a process of writing the results when there is a match are added to a source code. Since a change in the source code is requested, the burden is increased by change or generation of a program. In the patent literature 2, a common cause failure is not also recognized. The other problem and novel features will become apparent from the description of the specification and the appended drawings.

A semiconductor integrated circuit device according to an embodiment executes a plurality of threads while switching them synchronously with clocks. In the semiconductor integrated circuit device, a register used to execute a plurality of threads is provided for each thread, and a comparison circuit for comparing results of execution of a program for detecting a failure in two threads is provided.

In the embodiment, while suppressing deterioration in performance, detection of a failure can be improved.

BRIEF DESCRIPTION OF THE DRAWINGS

FIG. 2 is an explanatory diagram illustrating the configuration of a register in the first embodiment.

FIG. 3 is an explanatory diagram illustrating the configuration of the register in the first embodiment.

DETAILED DESCRIPTION

Figure 1:
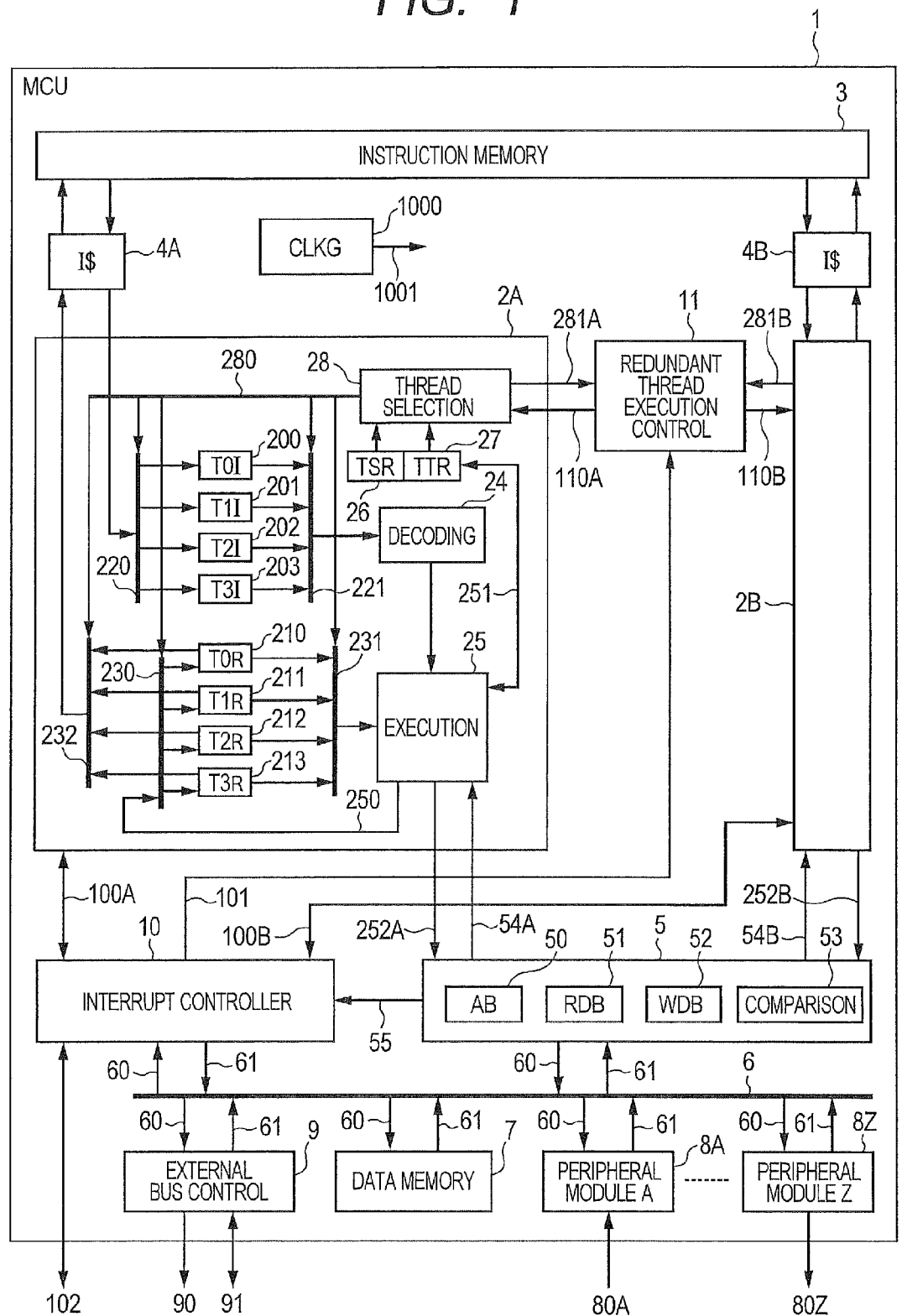
FIG. 1 is a block diagram illustrating a microcontroller according to a first embodiment.

In the following description, to simplify explanation, the same reference numerals are designated to blocks or waveforms having the same function and their detailed description may not be repeated. In the case where the description is not repeated, refer to the description of the block or waveform to which the same reference numeral is designated.

Outline of Embodiments

First, outline of an embodiment will be described with reference to FIG. 22 as a block diagram illustrating the outline of the embodiment. In the diagram, a microcontroller (MCU (Micro-Control Unit)) 1 has two microprocessors (cores of a Central Processing Unit (CPU) (hereinbelow, also called "CPU cores") 2A and 2B. Since the CPU cores 2A and 2B have the same configuration, in the following description, only the CPU core 2A will be described in detail.

The CPU core 2A has a register necessary to execute the program every thread as a software execution unit. In the embodiment, the CPU core 2A has, although not limited, four register sets (T0R, T1R, T2R, T3R) 210, 211, 212, and 213 so as to be able to execute four threads while switching the four threads. Although not limited, the register sets 210, 211, 212, and 213 have the same configuration, and have a plurality of registers used at the time of executing threads. In the embodiment, each of the register sets 210, 211, 212, and 213 includes, as registers, a program counter indicative of an address of an instruction to be executed, a state register indicative of the state of the CPU core, and a general register used for arithmetic process or the like.

Figure 22:
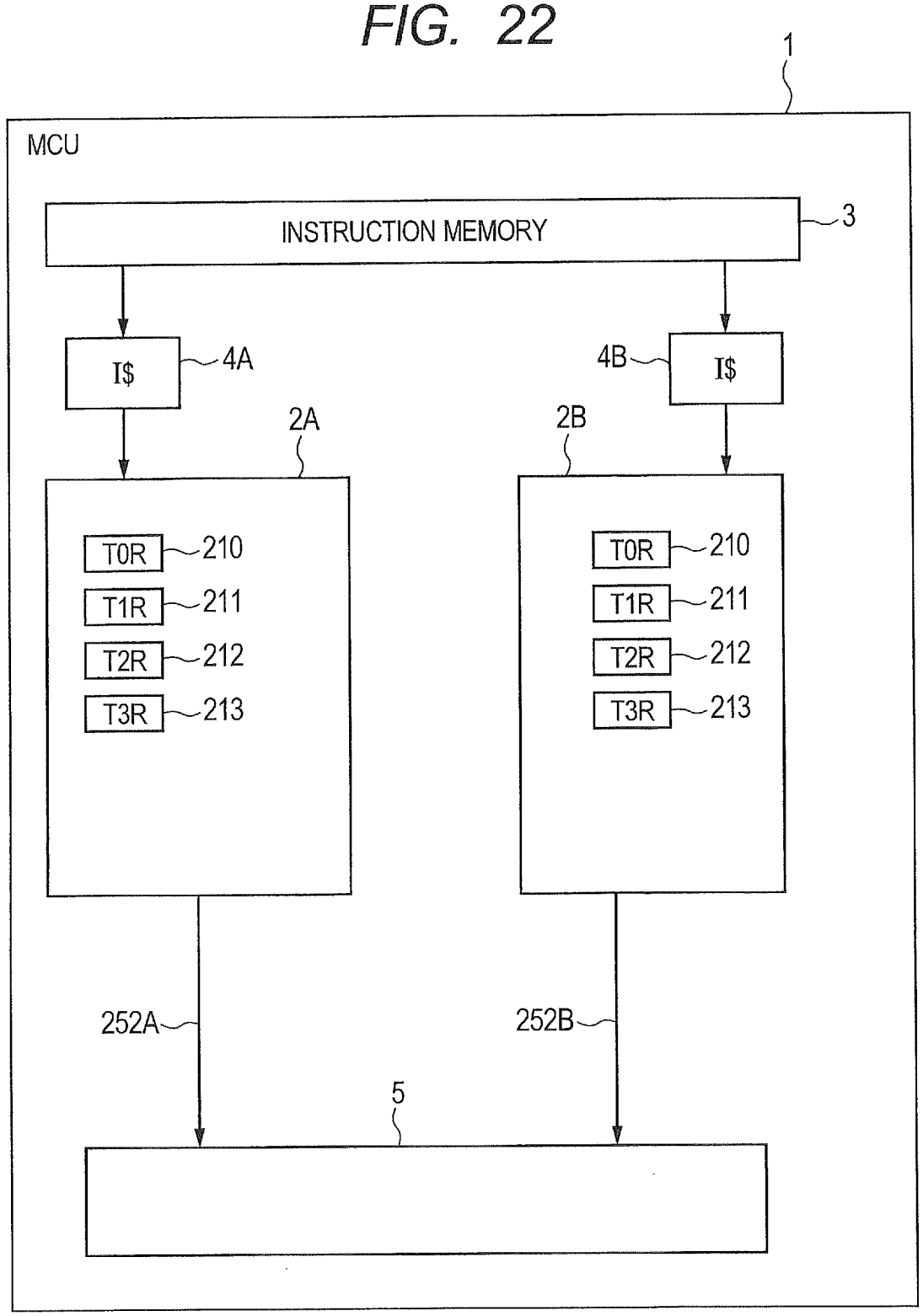
FIG. 22 is a block diagram illustrating outline of embodiments.

In FIG. 22, in an instruction memory 3, instructions to be executed by the CPU cores 2A and 2B are stored. Although not limited, an instruction read from the instruction memory 3 is supplied to the CPU core 2A via a cache memory (I$) 4A and supplied to the CPU core 2B via a cache memory (I$) 4B.

The instruction supplied from the cache memory 4A is executed in the CPU core 2A. That is, a plurality of instructions included in a thread as a software execution unit are sequentially fetched by the CPU core 2A via the cache memory 4A and sequentially executed by the register set provided in correspondence with the thread. When the register set corresponding to the thread including the fetched instruction is, for example, the register set 210, the instruction is executed by using the state register, the general register, and the like included in the register set 210. An instruction to be fetched next in the thread is indicated by the program counter provided for the register set 210. The other register sets 211, 212, and 213 are used to execute threads corresponding to the register sets. The CPU core 2A will be described more specifically in a following first embodiment, so further description is omitted here.

Since four threads can be executed in the CPU core 2A, one of the four threads is allocated as a redundant thread to software for diagnosing a failure in the CPU core 2A, and the remaining three threads are allocated as non-redundant threads to normal processes. As normal processes, although not limited, a process of controlling the engine of a vehicle is allocated. Also in the CPU core 2B, similarly, one of the four threads is allocated as a redundant thread to software for diagnosing a failure in the CPU core 2B, and the remaining threads are allocated to the normal process.

By allocating the threads in such a manner, six threads can be allocated as non-redundant threads to execute the normal process, so that decrease in the performance can be suppressed.

On the other hand, when a redundant thread is executed, each of the CPU cores 2A and 2B supplies a result of execution using the register set and information indicative of a redundant thread as signals 252A and 252B to a system bus control circuit 5. The system bus control circuit 5 compares results of execution of the redundant threads and, in the case of a mismatch, forms information indicating that a failure occurs. The system bus control circuit 5 will be described in detail in the first embodiment. It is to be understood that the system bus control circuit 5 has a function of a comparison circuit for comparing results of execution of redundant threads by the CPU cores 2A and 2B.

By allocating the register set to each thread, a process of loading, at the time of switch of the thread, data used in a thread after the switch can be omitted, and deterioration in the performance can be suppressed. Since two redundant threads are executed by using different register sets, a failure in each of the program counter, the state register, the general register, and the like configuring each of the register sets can be detected, and a common factor failure can be detected.

Although a redundant thread is executed in each of the CPU cores 2A and 2B in the above example, two redundant threads may be executed in, for example, the CPU core 2A as one of the CPU cores. In this case, it is sufficient to supply the signal 252B from the CPU core 2A to the system bus control circuit 5. Alternately, a buffer for holding the content of the signal 252A may be provided in the system bus control circuit 5. In any case, the CPU core 2B does not have to be always provided. Miniaturization can be achieved and the cost can be reduced.

Although it may be understood from the above description, a redundant thread is a unit of executing software for diagnosing a failure in the microcontroller 1 or the CPU core, and a non-redundant thread is a unit of executing software for executing normal process. To express a plurality of kinds of registers used at the time of executing a thread as one unit, an expression of a resistor set is used.

Although an example of providing the cache memories 4A and 4B has been described in the embodiment of FIG. 22, the cache memories 4A and 4B may not be provided. Although the microcontroller 1 illustrated in FIG. 22 is formed on a single semiconductor chip (semiconductor substrate) by the semiconductor integrated circuit technique, when cache memories are not provided, miniaturization of the semiconductor chip can be realized, and cost can be reduced. Although not illustrated in FIG. 22, the microcontroller 1 is provided with a clock generation circuit. According to (synchronously with) a clock from the clock generation circuit, each of the CPU cores executes a program while switching threads. The microcontroller is also called a data processor or a semiconductor integrated circuit device.

First Embodiment

FIG. 1 is a block diagram of the dual-core microcontroller (MCU) 1 having a register set necessary for executing a program for each thread as a unit of executing software and having a multithreading calculation function of switching and executing a thread every clock in the first embodiment. Although an example of executing the same program in one thread which is executed in each of two CPU cores in order to conduct a diagnosis will be described, the embodiment is not limited to the example. The embodiment can be also applied to a mode of executing the same program in two threads which are executed in one CPU core and a mode of executing the same programs of two or more kinds in four or more threads.

1. CPU Core

In the diagram, the CPU cores 2A and 2B have the same function. Each of the CPU cores can process four threads (threads numbers 0, 1, 2, and 3) in parallel.

In the diagram, instruction buffers (T0I, T1I, T2I, and T3I) 200, 201, 202, and 203 temporarily store instructions to be executed in the thread numbers 0, 1, 2, and 3, respectively. Register sets (T0R, T1R, T2R, and T3R) 210, 211, 212, and 213 are used when the thread numbers 0, 1, 2, and 3 execute processes, respectively. Each of the register sets 210, 211, 212, and 213 includes a program counter, a general register, a state register, and the like. A write circuit 220 writes fetched instructions to the instruction buffers 200, 201, 202, and 203 of the corresponding threads. An instruction buffer selection circuit 221 selects an instruction buffer corresponding to a thread. A write circuit 230 selects a register set corresponding to the thread from the four register sets and writes a result of execution of the instruction into the register in the selected register set. A register selection circuit 231 selects a register set corresponding to the thread from the four register sets. A selection circuit 232 selects a program counter in the register set corresponding to the thread from the four register sets and outputs an instruction fetch address.

In the diagram, a decoding circuit (indicated as "decoding" in FIG. 1) 24 decodes an instruction of a thread supplied from the instruction buffer selected by the instruction buffer selection circuit 221 and instructs an execution circuit (indicated as "execution" in FIG. 1) 25. According to the instruction from the decoding circuit 24, the execution circuit 25 reads data necessary to execute the instruction by using the register set corresponding to the thread selected by the register selection circuit 231 and executes the instruction. In the case where the fetched instruction is an instruction of rewriting the result of execution of the execution circuit 25 to the register, data to be written in the register is supplied to the register write circuit 230 via a line 250 and is rewritten in the register in the register set corresponding to the thread.

A line 251 is used by the execution circuit 25 to read/write data in a thread scheduling register (TSR) 26 and a thread type register (TTR) 27 which will be described later. A signal 252A to be output from the execution circuit 25 to the outside of the CPU core 2A includes a command of a memory access to a data memory 7 or the like to be described later, an address, data to be written, and information of the type of the thread to be described later. A signal 252B similar to the signal 252A is output also from the CPU core 2B. A signal 54A which is supplied from the outside of the CPU core 2A to the execution circuit 25 is read data which is read from the data memory 7 or the like when the memory access to the data memory 7 or the like is a read access. The memory access includes not only an access to a memory but also an access to a register in a peripheral module. A similar signal 54B is supplied also to the CPU core 2B.

In the TSR 26, a thread execution schedule is set. The details will be described later with reference to FIG. 2. In the TTR 27, the type of a thread is set. The details of the TTR 27 will be described later with reference to FIG. 3.

In FIG. 1, a thread selection circuit (indicated as "thread selection" in FIG. 1) 28 selects a thread in which instruction fetch and instruction execution is performed. The thread selection circuit 28 forms a selection signal 280 based on the data set in the TSR 26 and supplies it to the selection circuits 221, 231, and 232 and the write circuits 220 and 230. A signal 281A output from the thread selection circuit 28 to the outside of the CPU core 2A is a signal indicative of execution of a redundant thread (hereinbelow, called "redundant thread signal"). A similar signal 281B is output also from a thread selection circuit (not illustrated) in the CPU core 2B. Signals 110A supplied from the outside of the CPU core 2A to the thread selection circuit 28 are a signal for inhibiting selection of a redundant thread (hereinbelow, called "redundant thread selection inhibition signal") and a signal indicative of interrupt inhibition (hereinbelow, called "redundant thread interrupt inhibition signal"). Signals 110B similar to the signals 110A are supplied to a thread selection circuit (not illustrated) in the CPU core 2B.

2. Instruction Memory and Cache Memory

The instruction memory 3 stores instructions executed by the CPU cores 2A and 23. The microcontroller 1 illustrated in FIG. 1 is, for example, a microcontroller assembled in a system (a vehicle or the like) and controlling the system. Consequently, although not limited, a flash memory is used as the instruction memory 3. A flash memory is an electrically erasable and programmable read only memory. As the control is becoming sophisticated, the capacity of the flash memory is increasing. When the speed of the operation clock of the CPU core becomes high, reading in a one clock cycle becomes difficult. Although not limited, a cache for the flash memory is provided for the microcontroller 1 to enable reading in one cycle from the CPU core. The cache memory (I$) 4A is for the CPU core 2A, and the cache memory (I$) 4B is for the CPU core 2B.

3. System Control Circuit and Circuit Controlled by the Same

In the diagram, the system bus control circuit 5 controls accesses from the CPU cores 2A and 2B to a system bus 6. To the system bus 6, the data memory 7, peripheral modules (in FIG. 1, indicated as "peripheral module A" to "peripheral module Z") 8A to 8Z, an external bus control circuit (in FIG. 1, indicated as "external bus control") 9, and an interrupt controller 10 are coupled. In the diagram, signals 60 indicate a command, an address, and write data in the system bus 6, and signals 61 indicate read data. Although not limited, as the data memory 7, an SRAM (Static Random Access Memory) is used. A memory cell in the SRAM includes a pair of CMOS inverters and a pair of NMOS transistors for access. Other than the data memory 7, a flash memory for storing data may be provided.

(1) System Bus Control Circuit

The system bus control circuit 5 has an address buffer (AB, first buffer) 50, a read data buffer (RDB, second buffer) 51, a write data buffer (WDB, third buffer) 52, and a comparison circuit (indicated as "comparison" in FIG. 1) 53. Although not illustrated, the comparison circuit 53 has a first comparison circuit for comparing addresses and a second comparison circuit for comparing data. Those circuits function when an access to the system bus 6 is made by execution of a redundant thread. Although not illustrated in FIG. 1, the system bus control circuit 5 is provided with a control circuit for controlling those circuits as will be described later.

As described above, the information indicative of the type of the thread to be executed is included in the signal 252A output from the CPU core 2A and the signal 252B output from the CPU core 23.

(a) Execution of Non-Redundant Thread

In the case where the signal 252A indicates an access to the system bus 6 accompanying execution of a non-redundant thread, the system bus control circuit 5 outputs information (a command and an address) included in the signal 252A to the system bus 6. In the case where the access to the system bus 6 is a write access, information (write data) included in the signal 252A is output to the system bus 6. In the case where the access is a read access, read data in the system bus 6 is output as the signal 54A to the CPU core 2A.

Also with respect to the CPU core 2B, like the CPU core 2A, in the case where the signal 2523 indicates an access accompanying execution of a non-redundant thread, a command and an address included in the signal 252B are output to the system bus 6. In the case where the access is a write access, write data included in the signal 2523 is also output to the system bus 6. On the other hand, in the case where the access is a read access, data in the system bus 6 is output as read data of the signal 54B to the CPU core 2B.

In the case where an instruction executed before is, for example, a memory access instruction and the access is being executed, the above-described access to the system bus 6 has to wait until the access being executed is completed. This example corresponds to the case where a memory access wait which will be described later with reference to FIGS. 4A to 4D occurs. As will be described in FIGS. 4A to 4D, when an MA stage of executing a memory access cannot be completed in one cycle in response to an instruction executed before and is extended by two cycles of an MA1 stage and an MA2 stage, in the case where the following instruction is a memory access instruction, the MA stage of the instruction overlaps the MA1 stage. Due to this, the access to the system bus 6 in response to the following instruction has to wait. In the case where memory accesses occur simultaneously from the CPU cores 2A and 2B, the MA stages overlap. Consequently, the memory accesses are not executed simultaneously but are executed one by one in order.

(b) Execution of Redundant Thread

On the other hand, in the case where the signal 252A or 252B indicates an access accompanying execution of a redundant thread, processes as will be described are executed.

(i) Read Access

In the case where a redundant thread executed first, that is, a preceding redundant thread is a read access to the system bus 6, an access to the system bus 6 is executed. That is, accompanying execution of a preceding redundant thread, an address is formed. The formed address is registered in the AB 50. According to the formed address, for example, read data which is read from the data memory 7 is output to the CPU core via the system bus 6. The read data is registered in the RDB 51.

In the case where a read access is generated accompanying execution of a redundant thread executed after the preceding redundant thread, that is, a following redundant thread, in a read access accompanying execution of the following redundant thread, an access to the system bus 6 is not executed. In this case, in the system bus control circuit 5, the first comparison circuit in the comparison circuit 53 compares the address in the access generated accompanying execution of the following redundant thread and the AB 50.

In the case where the address comparison results match in the comparison in the comparison circuit 53, for the read access accompanying execution of the following redundant thread, the system bus control circuit 5 supplies data preliminarily registered in the RDB 51 as read access data to the CPU core 2A. In the case where the address comparison results do not match in the comparison in the comparison circuit 53, the system bus control circuit 5 outputs a system bus access error signal 55 to the interrupt controller 10.

(ii) Write Access

In the case where the access to the system bus 6 accompanying execution of the preceding redundant thread is a write access, the system bus control circuit 5 does not execute the access to the system bus 6 but registers the address included in the signal 252A or 252B from the CPU core which has executed the preceding redundant thread into the AB 50. The system bus control circuit 5 also registers data to be written included in the signal 252A or 252B from the CPU core which has executed the preceding redundant thread into the WDB 52.

In the case where an access generated accompanying execution of the following redundant thread is a write access, the system bus control circuit 5 executes comparison between the address included in the signal 252A or 252B from the CPU core which has executed the following redundant thread and the address which is preliminarily registered in the AB 50 by the first comparison circuit in the comparison circuit 53. The system bus control circuit 5 executes comparison between write data included in the signal 252A or 252B from the CPU core which has executed the following redundant thread and the write data which is preliminarily registered in the WDB 52 by the second comparison circuit in the comparison circuit 53. In the example, the comparison 53 has the first and second comparison circuits. The comparison circuit 53 may separately have a comparison circuit used at the time of a write access and a comparison circuit used at the time of a read access. In such a manner, the control of the comparison circuit can be simplified.

In the case where a match of the address and the write data with the address and the write data preliminarily registered is detected by the comparison circuit 53, the system bus control circuit 5 outputs the address and the write data registered in the AB 50 and the WDB 52 to the system bus 6. Using the address and the write data output to the system bus 6, the write access to the data memory 7 or the like is executed.

In the case where whether the address and the write data match with the address and the write data preliminarily registered or not is detected by the comparison circuit 53 and the address or the write data does not match, the system bus control circuit 5 outputs the system bus access error signal 55 to the interrupt controller 10. Although not limited, when a mismatch is detected by the comparison circuit 53, the write access is not executed.

(2) Peripheral Module

The peripheral module 8A is, for example, an A/D converter for converting an analog input signal 80A to a digital signal. The peripheral module 8Z is, for example, a timer which generates a pulse output signal 80Z.

(3) External Bus Control Circuit

In the case where an access to the system bus 6 is an access to address space allocated on the outside of the microcontroller 1, the external bus control circuit (indicated as "external bus control" in FIG. 1) 9 outputs a command and an address as a signal 90 via an external terminal (not illustrated) and, via an external terminal (not illustrated) receives data as a signal 91 (in the case of a read access) or outputs data as a signal 91 (in the case of a write access).

(4) Interrupt Controller

The interrupt controller 10 receives an interrupt request as a signal 102 from the outside via an interrupt terminal (not illustrated) and sends a response as a signal 102. That is, the signal 102 includes the interrupt request signal and the interrupt response signal. A signal 100A between the CPU core 2A and the interrupt controller 10 includes an interrupt request signal to the CPU core 2A and a response signal from the CPU core 2A. A signal 100B between the CPU core 2B and the interrupt controller 10 also includes an interrupt request to the CPU core 2B and a response signal from the CPU core 2B. A signal 101 from the interrupt controller 10 to the redundant thread execution control circuit (in FIG. 1, indicated as "redundant thread execution control") 11 is an interrupt request signal to a redundant thread.

4. Redundant Thread Execution Control Circuit (Outline)

The redundant thread execution control circuit 11 receives the redundant thread signal 281A indicative of execution of a redundant thread by the CPU core 2A and the redundant thread signal 281B indicative of execution of a redundant thread by the CPU core 2B and manages the number of execution times of the redundant thread. To manage the number of execution times of the redundant thread, the redundant thread execution control circuit 11 outputs a redundant thread selection inhibition signal and the redundant thread interrupt inhibition signal 110A to the CPU core 2A. Similarly, the redundant thread execution control circuit 11 outputs a redundant thread selection inhibition signal and the redundant thread interruption inhibition signal 110B to the CPU core 2B.

Although not illustrated in FIG. 1, the redundant thread execution control circuit 11 has a control circuit. Control performed by the control circuit will be understood in the following description using FIG. 11 and the like. To prevent the drawings from becoming complicated, in FIG. 1, the redundant thread selection inhibition signal and the redundant thread interruption inhibition signal are indicated by one reference numeral 110A (and reference numeral 110B).

5. Clock Generation Circuit

A clock generation circuit (CLKG) 1000 supplies a clock signal (CLK) 1001 to each of blocks. Each of the blocks has a sequential circuit including a flip flop and a combinational circuit, and a clock according to the clock signal 1001 is supplied to, for example, the sequential circuit. As a result, the blocks operate synchronously with the clock signal 1001.

6. Thread Control Register (1) Thread Scheduling Register (TSR)

FIG. 2 illustrates an example of the configuration of the thread scheduling register (TSR) 26. The TSR 26 is a register of 16 bits. Eight bit names of S0 to S7 each made of two bits are designated from the high-order bits, and the numbers of threads (hereinbelow, also called thread numbers) are set. When the thread number is expressed in binary numeral, "00" expresses thread number 0, "01" expresses thread number 1, "10" expresses thread number 2, and "11" indicates thread number 3.

The threads are selected and executed in order of the bit names S0 to S7 assigned to the eight bit names. For example, when "00" is set to two bits of the bit name S0 and "11" is set to the bit name S1, the thread number 0 corresponding to the binary numeral "00" is executed and, next, the thread number 3 corresponding to the binary numeral "11" is executed. That is, the thread number is set to each of the bit names S0 to S7 of the TSR 26, and the thread numbers stored in the bit names are selected and executed in the order of the bit names S0, S1, S2, S3, S4, S5, S6, and S7. In this case, the bit name S0 follows the bit name S7 and the order is repeated.

(2) Thread Type Register (TTR)

FIG. 3 illustrates an example of the configuration of the thread type register (TTR) 27. The TTR 27 is a register of 16 bits. Four bit names of T0 to T3 are designated every four bits from the high-order bits, and the types of the thread numbers 0 to 3 are set. Specifically, the type of the thread number 0 is set for the bit name T0, the type of the thread number 1 is set for the bit name T1, and the type of the thread number 2 is set for the bit name T2. Similarly, the type of the thread number 3 is set for the bit number T3.

The type of a thread is expressed in binary numeral. "0000" to "0111" denote non-redundant threads, "1000" denotes redundant thread 0, "1001" denotes redundant thread 1, "1010" denotes redundant thread 2, "1011" denotes redundant thread 3, and "1100" to "1111" denote reserved threads. The non-redundant thread denotes a thread including no redundant execution. The redundant thread denotes a thread in which the same program is executed in a plurality of threads.

For example, in the TTR 27 of the CPU core 2A, the bit name T0=T1="0000", the bit name T2="1000", and the bit name T3="1001". When it is set in the TTR 27 of the CPU core 2B that the bit name T0="1000", the bit name T1="1001", and the bit name T2=T3="0000", the same program is executed as the redundant thread 0 in the thread number 2 of the CPU core 2A and the thread number 0 of the CPU core 2B. In a system bus access which is made when a redundant thread is selected and executed, as described above, the system bus control circuit 5 compares results of the execution. The same program is executed as the redundant thread 1 in the thread number 3 of the CPU core 2A and the thread number 1 of the CPU core 2B, and results are compared in a manner similar to the above. The other threads are executed as non-redundant threads, and results are not compared.

(3) Setting of Register

Setting of thread numbers in the TSR 26 and the TTR 27 and setting of thread types are made by executing a program for the settings. The program for setting may be, for example, a program of storing numbers and types of the threads in a general register included in any of the register sets 210 to 213 and transferring data from the general register to the TSR 26 and the TTR 27. Since a data transfer instruction used in the program for setting exerts an influence on the basic operation of the CPU cores, it is desirably a dedicated instruction also from the viewpoint of safety. Since the TSR 26 and the TTR 27 are provided for each of the CPU cores, the program for setting is executed in each of the CPU cores. Obviously, as the general register used for setting, a register different from the general register provided for the register set may be used.

7. Instruction Pipeline of CPU core

FIGS. 4A to 4D illustrate an example of timings of instruction pipelines of the CPU cores 2A and 2B. The instruction pipeline denotes a method of overlappingly executing a plurality of instructions in the same circuit. The circuit is divided into a plurality of stages, and one instruction is executed in each stage in accordance with the clock signal (CLK) 1001.

In FIGS. 4A to 4D, FIG. 4A expresses a basic pipeline. IA (Instruction Address) denotes a stage of outputting an instruction address, and IF (Instruction Fetch) denotes a stage of fetching an instruction. D (Decode) denotes a stage of decoding a fetched instruction, and EX (Execute) denotes a stage of executing an instruction. Further, MA (Memory Access) denotes a stage of executing a memory access, and WB (Write Back) denotes a stage of writing back an instruction execution result and a memory access execution result into a register.

Figure 4A:
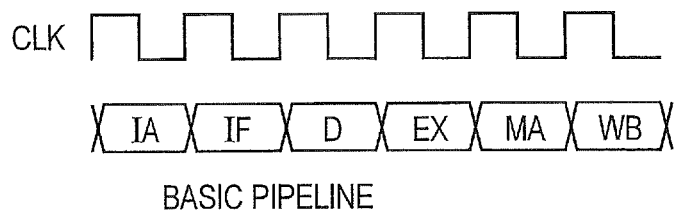
FIGS. 4A to 4D are timing charts illustrating pipeline operation of a CPU core in the first embodiment.
Figure 4B:
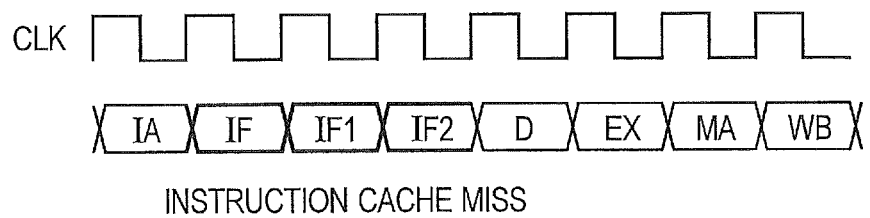
Figure 4C:
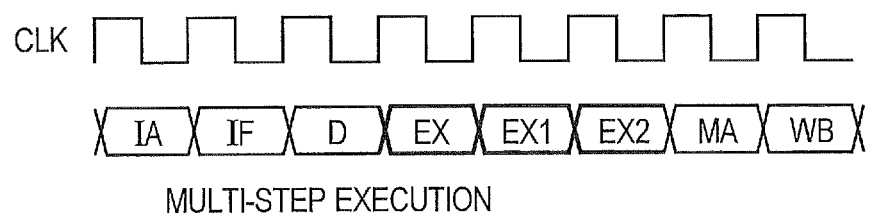
Figure 4D:
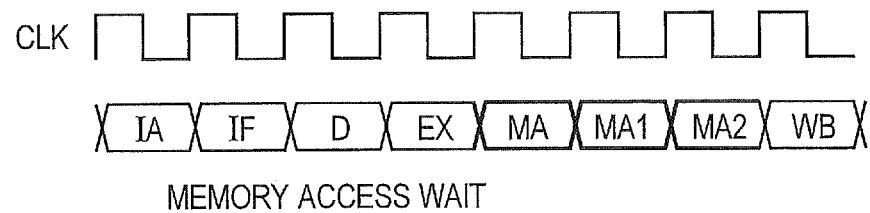

In the diagram, FIGS. 4B to 4D express examples in each of which the pipeline is disturbed. FIG. 4B expresses that the IF stage cannot be finished in one cycle due to an instruction cache miss and is extended, for example, by two cycles of IF1 and IF2 stages to wait for reading of a missed instruction. FIG. 4C expresses that the EX stage cannot be finished in one cycle in multi-step execution and is extended, for example, by two cycles of EX1 and EX2 stages. Examples of the multi-step execution include a multiplication instruction and a division instruction. FIG. 4D expresses an example that, in memory access wait, the MA stage cannot be completed in one cycle and is extended, for example, by two cycles of the MA1 and MA2 stages to execute a memory access. Examples of the memory access wait include the case of reading a register in a peripheral module in which access time is long and the case where an access wait occurs due to collision with an access to another CPU core in the system bus.

Figure 5:
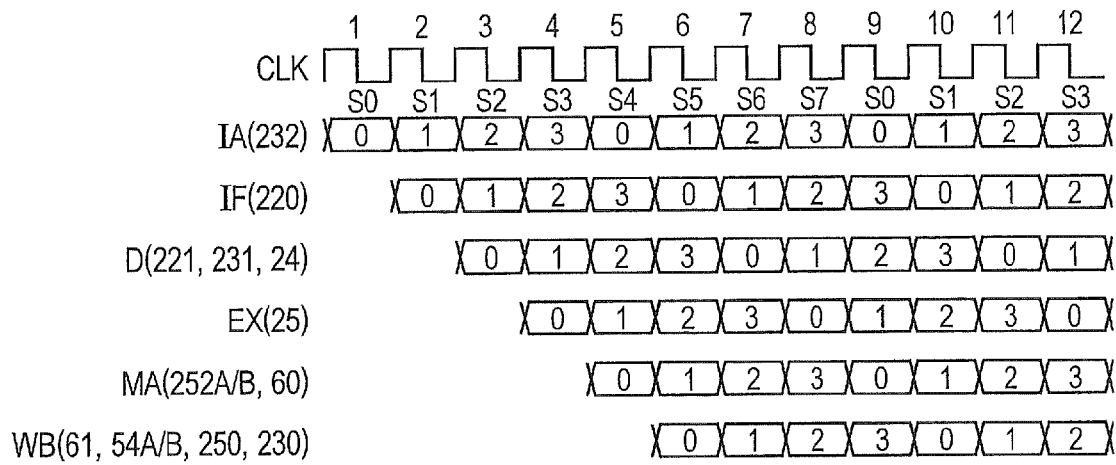
FIG. 5 is a timing chart illustrating pipeline operation of multithreads in the first embodiment.

8. Pipeline Operation in Multithread (1) In the case where there is no disturbance in pipeline FIG. 5 illustrates a timing example of pipeline process in a multithread in which the program is executed while switching threads in accordance with the clock signal (CLK) 1001. The stages are six stages from IA stage to WB stage like the pipeline illustrated in FIGS. 4A to 4D. As the order of threads to be executed, threads are executed from the thread number 0 to 3 in the example. To realize the execution schedule, bit names in the TSR 26 are set as follows; bit name S0=S4=thread number 0, bit name S1=S5=thread number 1, bit number S2=S6=thread number 2, and bit name S3=S7=thread number 3.

In FIG. 5, to make the relation with the block diagram of FIG. 1 understood easily, the name of a stage in the pipeline and a reference numeral in FIG. 1 related to the stage are also written on the left side of each waveform. Also in drawings to be described later, those are written. An example of the writing will be described with reference to FIG. 5.

In FIG. 5, the numeral in parentheses on the right side of reference characters IA is the reference numeral 232 of the program counter selection circuit in FIG. 1. Similarly, the numeral in parentheses of the reference characters IF in FIG. 5 is the reference numeral 220 of the instruction buffer write circuit in FIG. 1. The numerals in parentheses of the reference character D are reference numerals 221, 231, and 24 of the instruction buffer selection circuit, the register selection circuit, and the decoding circuit in FIG. 1. The numeral in parentheses of the reference characters EX is the reference numeral 25 of the execution circuit in FIG. 1. The alphanumeric characters 252A and 252B in parentheses of the reference characters MA correspond to the reference numerals 252A and 252B of the signals from the CPU cores 2A and 2B to the system bus control circuit 5 in FIG. 1. The numeral 61 in parentheses of the reference characters WB corresponds to the reference numeral 61 of the read data. The numeral 60 corresponds to the reference numeral 60 of a command, an address, and write data of the system bus 6 in FIG. 1. The alphanumeric characters 54A and 54B correspond to the reference numerals 54A and 54B of read data from the system bus control circuit 5 in FIG. 1 to the CPU cores 2A and 2B. The numeral 250 corresponds to the reference numeral 250 of register write data in FIG. 1, and the numeral 230 corresponds to the reference numeral 230 of the register write circuit of an execution result in FIG. 1.

The numerals 0 to 3 written in the stages in the pipeline indicate numbers of the threads in the stages. The numeral shown at each trailing edge of CLK on the upper side of the CLK waveform indicates the clock cycle number (CLKNO).

FIG. 5 illustrates an example where there is no disturbance in the pipeline. For example, as CLKNO changes from 1 to 6, the instruction in the thread number 0 sequentially shifts from the IA stage to the WB stage and is executed. Similarly, as CLKNO changes from 5 to 10, the next instruction in the thread number 0 sequentially shifts from the IA stage to the WB stage and is executed. Instructions in the other thread numbers are similarly executed.

Although only the timings of the pipeline of, for example, the CPU core 2A are shown in FIG. 5, similar pipeline operations are performed also with respect to the other CPU core 2B. In the following, it is to be understood that timings of the pipeline in two CPU cores are similar unless otherwise described separately in two CPU cores.

(2) Case where Instruction Cache Miss Occurs

Figure 6:
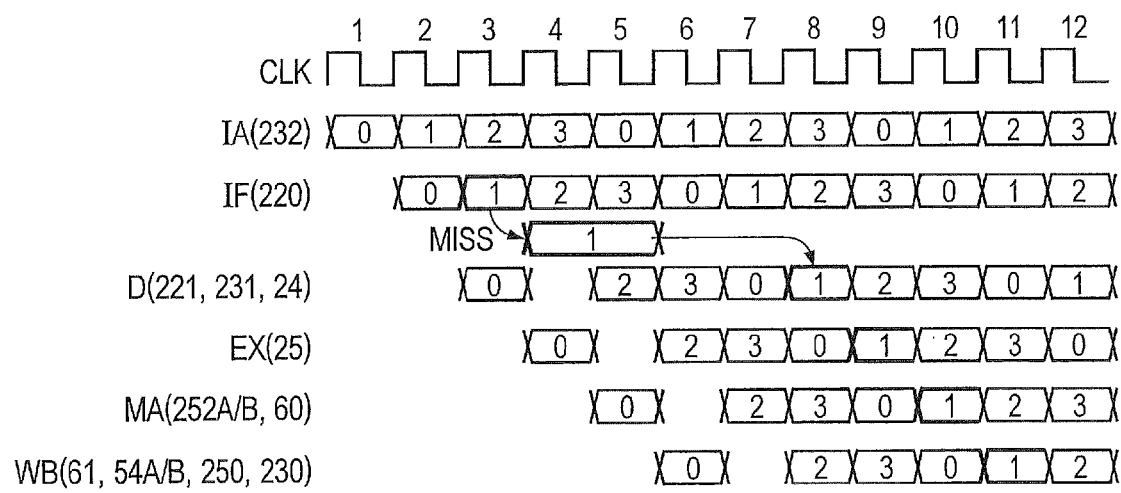
FIG. 6 is a timing chart illustrating pipeline operation of multithreads in the first embodiment.

FIG. 6 illustrates an example of timings when an instruction cache miss occurs in multithread pipeline process. Since a cache miss occurs in instruction fetch in the thread number 1 in the clock cycle of CLKNO=3, the IF stage is extended in CLKNO=4 and 5. Although it is scheduled to decode the instruction of the thread number 1 in CLKNO=4, the instruction is not prepared in the instruction buffer, so that the D stage of decoding is cancelled. In the example, the instruction of the thread number 2 is decoded in the next CLKNO=5. However, the circuit can be designed so that when there is an instruction in the instruction buffer 202 of the thread number 2 at CLKNO=4, the instruction is decoded ahead of schedule. It is preferable since blank in the pipeline process decreases and the performance improves. The instruction of the thread number 1 in which the cache miss occurs is fetched by the instruction buffer 201 at CLKNO=5 and decoded at CLKNO=8 in which the instruction of the thread number 1 is scheduled to be decoded. As described above, there is the case that the instruction pipeline process is disturbed by an instruction cache miss.

(3) Case where Multistep Execution is Generated

Figure 7:
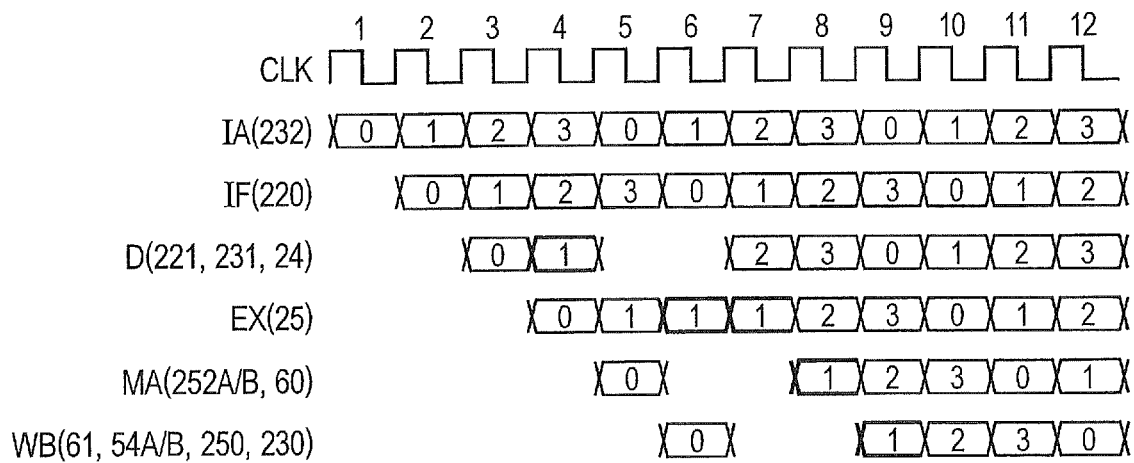
FIG. 7 is a timing chart illustrating pipeline operation of multithreads in the first embodiment.

FIG. 7 illustrates an example of timings when multistep execution is generated in multithread pipeline process. After decoding the instruction of the thread number 1 in the clock cycle of CLKNO=4, it is found to be multistep execution. After the EX stage of CLKNO=5, EX stages of two cycles are added. The D stage at CLKNO=5 and 6 is cancelled. When the EX stage of the thread number 1 is extended, execution of the following memory access and write back is delayed. In such a manner, there is the case that the instruction pipeline process is disturbed by multistep execution.

(4) Case where Memory Access Wait Occurs

Figure 8:
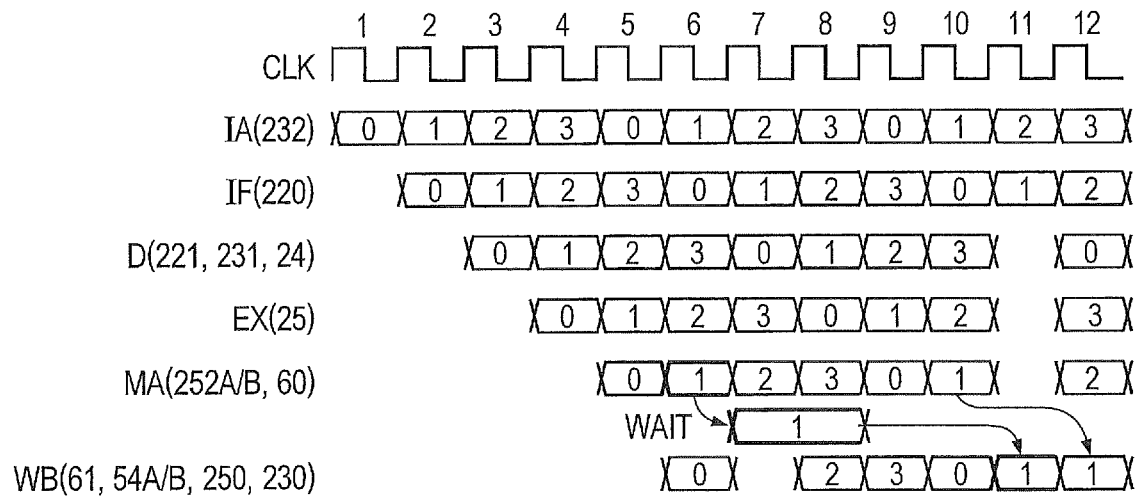
FIG. 8 is a timing chart illustrating pipeline operation of multithreads in the first embodiment.

FIG. 8 illustrates an example of timings when a memory access wait occurs in the multithread pipeline process. In the clock cycle of CLKNO=6, a wait occurs in the memory access of the thread number 1, and the MA stages are added in CLKNO=7 and 8. Since it is a read access, write back to a register which was scheduled to be executed at CLKNO=7 is executed at CLKNO=11. At CLKNO=10, the next memory access of the thread number 1 is executed. However, write back cannot be executed at CLKNO=11, the pipeline process in the D stage, the EX stage, and the MA stage at CLKNO=11 is cancelled, and the WB stage is executed at the next CLKNO=12. In such a manner, there is the case that the instruction pipeline process is disturbed by a memory access wait.

Figure 9:
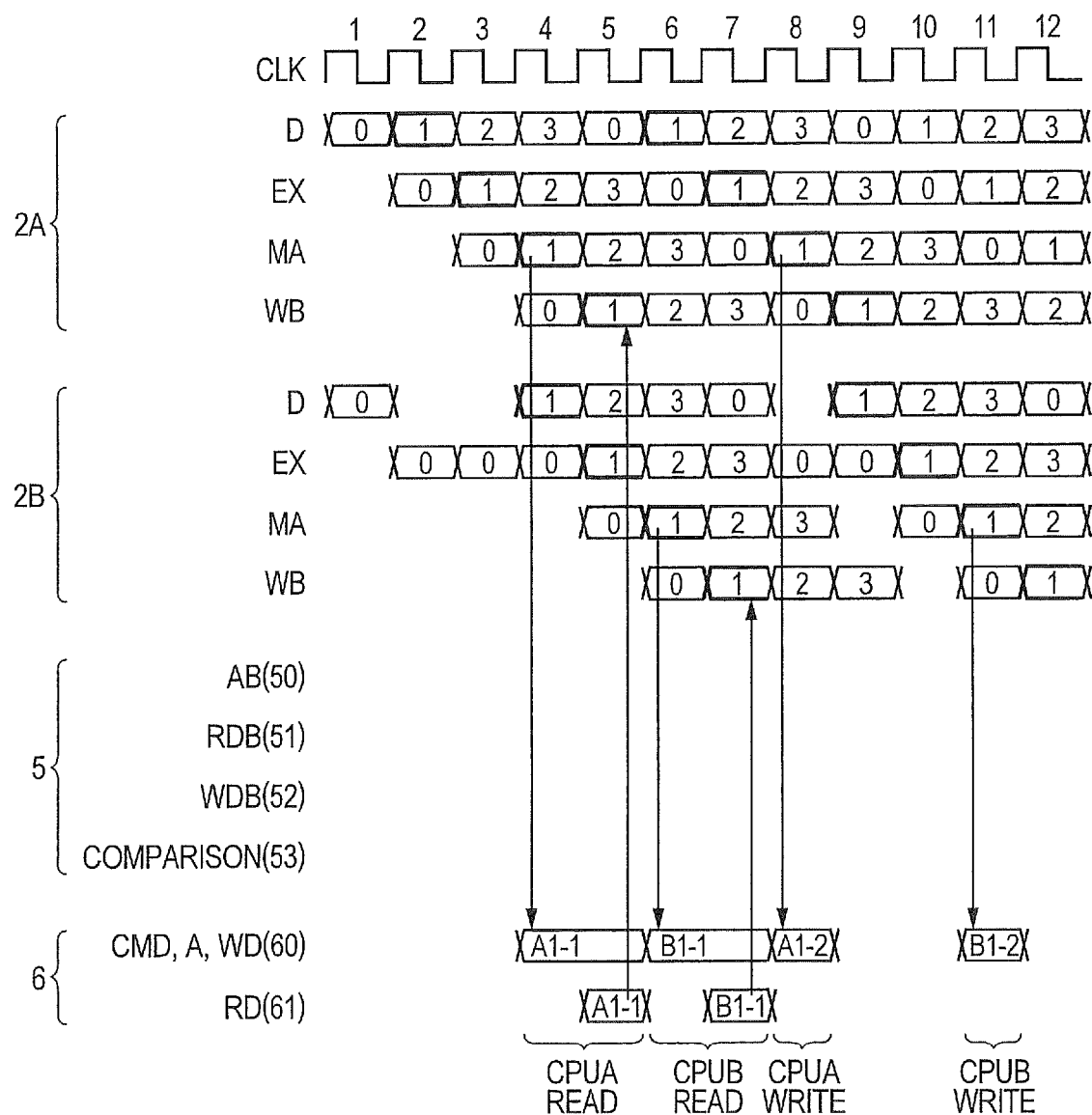
FIG. 9 is a timing chart illustrating operation of non-redundant thread execution in the first embodiment.

9. Operation in the Case of Accessing Memory in Execution of Non-Redundant Thread FIG. 9 illustrates an example of timings in the case of accessing a memory in a non-redundant thread. In the diagram, timings on pipelines of the CPU cores 2A and 2B, timings of the system bus control circuit 5 in FIG. 1, and timings of the system bus 6 are illustrated. The timings on the pipeline of the CPU core 2A are indicated as 2A in FIG. 9, and those on the pipeline of the CPU core 2B are indicated as 2B. In the timings of the system bus control circuit 5, the address buffer 50 is written as AB (50), the read data buffer 51 is written as RDB (51), the write buffer 52 is written as WDB (52), and the comparison circuit 53 is written as comparison (53). Those timings are collectively written as "5". In the timings of the system bus 6, the command 60, the address 60, and the write data 60 are written as "CMD, A, WD (60)", and the read data 61 is indicated as RD (61). Those timings are collectively written as "6". Also in FIG. 10 to be described later, a similar display manner is employed.

In FIG. 9, the thread number 1 of the CPU core 2A and the thread number 1 of the CPU core 2B are non-redundant threads. It is assumed that an instruction of the decode stage D at CLKNO=2 of the CPU core 2A is an instruction in the non-redundant thread of the thread number 1 and is a memory read instruction. It is assumed that an instruction of the decode stage D at CLKNO=6 is an instruction in the non-redundant thread of the thread number 1 and is a memory write instruction. On the other hand, it is assumed that an instruction of the decode stage D at CLKNO=4 of the CPU core 2B is an instruction in the non-redundant thread of the thread number 1 and is a memory read instruction. It is assumed that an instruction of the decode stage D at CLKNO=9 is an instruction in the non-redundant thread of the thread number 1 and is a memory write instruction.

(a) Memory Reading of CPU Core 2A (Written as "CPUA Read" in FIG. 9)

When the CPU core 2A executes a memory access (read) at CLKNO=4, the command 60 and the address 60 are output to the system bus 6 via the system bus control circuit 5 (period A1-1). In response to the memory access (read), the read data 61 in the system bus 6 is read by the CPU core 2A at CLKNO=5, and written in a register (for example, a general register) in a register set corresponding to the thread number 1 in the CPU core 2A (period A1-1).

(b) Memory Reading of CPU Core 2B (Written as "CPUB Read" in FIG. 9)

When the CPU core 2B executes a memory access (read) at CLKNO=6, the command 60 and the address 60 are output to the system bus 6 (period B1-1). The read data 61 in the system bus 6 is read by the CPU core 2B at CLKNO=7, and written in a register (for example, a general register) in a register set corresponding to the thread number 1 in the CPU core 2B (period B1-1).

(c) Memory Writing of CPU Core 2A (Written as "CPUA Write" in FIG. 9)

When the CPU core 2A executes a memory access (write) at CLKNO=8, the command 60, the address 60, and the write data 60 are output to the system bus 6 via the system bus control circuit 5 (period A1-2).

(d) Memory Writing of CPU Core 2B (Written as "CPUB Write" in FIG. 9)

When the CPU core 2B executes a memory access (write) at CLKNO=11, the command 60, the address 60, and the write data 60 are output to the system bus 6 (period B1-2).

10. Operation in the Case of Accessing Memory in Execution of Redundant Thread

Figure 10:
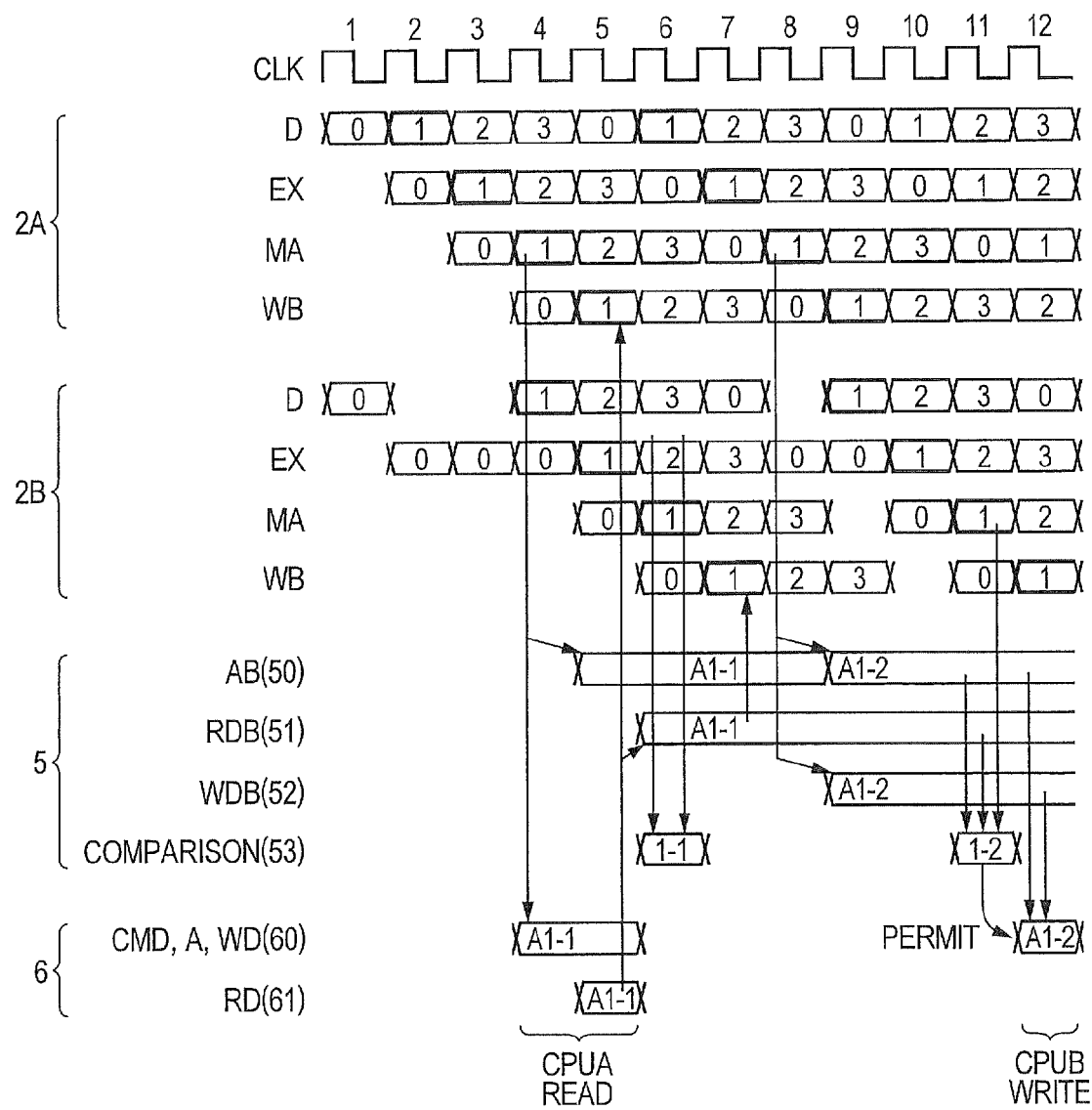
FIG. 10 is a timing chart illustrating the operation of redundant thread execution in the first embodiment.

FIG. 10 illustrates an example of timings in the case of accessing a memory in a redundant thread. Refer to the description of FIG. 9 for the reference numerals in the diagram.

The example of timings shown in FIG. 10 relates to the case where the thread number 1 of the CPU core 2A and the thread number 1 of the CPU core 2B are redundant threads. It is assumed that an instruction of the D stage at CLKNO=2 of the CPU core 2A is an instruction in the redundant thread of the thread number 1 and is a memory read instruction. It is assumed that an instruction of the D stage at CLKNO=6 is an instruction in the redundant thread of the thread number 1 and is a memory write instruction. On the other hand, it is assumed that an instruction of the D stage at CLKNO=4 of the CPU core 2B is an instruction in the redundant thread of the thread number 1 and is a memory read instruction. It is assumed that an instruction of the D stage at CLKNO=9 is an instruction in the redundant thread of the thread number 1 and is a memory write instruction.

(a) Memory Reading of CPU Core 2A (Written as "CPUA Read" in FIG. 10)

In FIG. 10, when the CPU core 2A executes a memory access (read) at CLKNO=4, the command 60 and the address 60 are output to the system bus 6 (period A1-1). Since it is execution of a redundant thread, the system bus control circuit 5 registers the address at that time into the address buffer 50 (period A1-1). The read data 61 in the system bus 6 is read by the CPU core 2A at CLKNO=5, and written in a register in a register set corresponding to the thread number 1 (period A1-1). The system bus control circuit 5 registers read data into the read data buffer 51 (period A1-1).

(b) Memory Reading of CPU Core 2B

When the CPU core 2B executes a memory access (read) at CLKNO=6, since it is execution of a redundant thread, the system bus control circuit 5 compares an address generated at CLKNO=6 with an address stored in the address buffer 50 (AB (50)) by the comparison circuit 53 (period 1-1). At this time, the system bus control circuit 5 does not output the command 60 and the address 60 to the system bus 6. The data from the write data buffer 51 is read by the CPU core 2B at CLKNO=7, and written in a register in a register set corresponding to the thread number 1. As described above, when a memory read access occurs in execution of a redundant thread, only an access to read a preceding thread is executed. By making a following thread read the read data, the same data is used. In the case where address comparison results do not match in comparison by the comparison circuit 53, the system bus control circuit 5 outputs the system bus access error signal 55 to the interrupt controller 10.

(c) Memory Writing of CPU Core 2A (written as "CPUA write" in FIG. 10)

When the CPU core 2A executes a memory access (write) at CLKNO=8, since the thread is a redundant thread, the system bus control circuit 5 registers the address into the address buffer 50 (period A1-2). Data to be written is registered in the write data buffer 52 (period A1-2).

(d) Memory Writing of CPU Core 2B

When the CPU core 2B executes a memory access (write) at CLKNO=11, since the thread is a redundant thread, the system bus control circuit 5 compares a write address at this time with an address stored in the address buffer 50 by the comparison circuit 53 (period 1-2). The system bus control circuit 5 compares the write data with the data stored in the write buffer 52 by the comparison circuit 53 (period 1-2). When results of the comparison by the comparison circuit 53 match, the command 60, the address 60, and the write data 60 are output to the system bus 6 at the next CLKNO=12 (period A1-2). As described above, the memory write in a redundant thread is executed after comparing access information (address and write data) of a preceding thread and that of a subsequent thread. It can prevent an illegal memory write causing a mismatch of addresses or write data.

11. Redundant Thread Execution Control Circuit (1) State Transition

Figure 11:
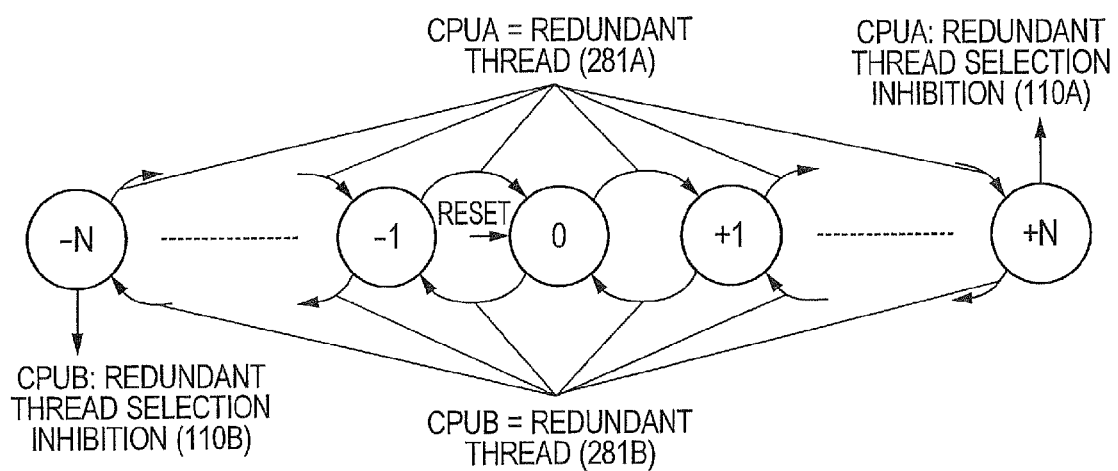
FIG. 11 is a diagram illustrating a state transition of a redundant thread execution control circuit in the first embodiment.

FIG. 11 illustrates an example of a state transition of the redundant thread execution control circuit 11 in FIG. 1. In the diagram, each of states such as −N, −1, 0, +1, and +N denotes the difference of the number of instruction execution times in redundant threads (CPU core 2A−CPU core 2B). In the diagram, CPUA denotes the CPU core 2A, CPUB denotes the CPU core 2B. With reference to FIG. 3, it was described that types of threads are set in the thread numbers 0 to 3 in the TTR 27. IN the embodiment, four threads can be executed while being switched. The types of threads can be set as redundant threads to all of four threads. The transitions shown in FIG. 11 are transitions for one redundant thread. To enable a redundant thread to be set for one thread, in the embodiment, the redundant thread execution control circuit 11 is configured so that the state transition shown in FIG. 11 can be executed thread by thread. Although the state transitions are independent of each other so that different redundant threads can be executed in each of the threads. However, since the state transitions are the same, one state transition will be described. The state transition is not performed thread by thread like in the embodiment but a restriction is made so that the redundant thread can be set only for specific threads (for example, thread numbers 0 and 1), management by the state transition can be reduced, so that miniaturization can be also achieved.

The operation using the buffer on a memory access which occurs in execution of a redundant thread has been described with reference to FIG. 10. Although not described with reference to FIG. 10, at the time of executing a redundant thread by two CPU cores, the address buffer (AB) 50, the read data buffer (RDS) 51, and the write data buffer (WDB) 52 as buffers become necessary only by the number according to the difference in the number of instruction execution times in the redundant thread.

For example, in the case where a first memory access instruction in a redundant thread is executed by the CPU core 2A, another second memory access instruction in a redundant thread is executed by the CPU core 2A, and the first memory access instruction in the redundant thread is executed by the CPU core 2B, a difference occurs between the number of instruction execution times (instruction execution number) of the CPU core 2A and that of the CPU core 2B. When the first memory access instruction is executed simultaneously in two redundant threads, the instruction execution number is zero. In the case where the first memory access instruction is executed in the first thread, the other second memory access instruction is performed in the first thread and, after that, the first memory access instruction is executed in a second thread as described above, the difference between the instruction execution numbers becomes two. When a difference occurs in the instruction execution numbers, to enable comparison of the execution results of the first instruction and comparison of the execution results of the other second instruction to be executed, buffers for storing a plurality of addresses and a plurality of pieces of data are necessary for each thread. As will be understood from the following description, for example, when the first memory access instruction is executed alternately by the CPU cores 2A and 2B, the difference of the instruction execution numbers become one.

When the CPU cores are reset, the number of execution times of the redundant thread in each of the CPU cores 2A and 2B is zero, and the difference of the number of execution times becomes zero. This corresponds to the state=0 in FIG. 11. In FIG. 1, when the redundant thread execution signal 281A is output from the thread selection circuit 28 of the CPU core 2A, the state increases by one and becomes "+1" in FIG. 11. After that, when the redundant thread execution signal 281B is output from the thread selection circuit 28 in the CPU core 2B, the state decreases by one, and the state "+1" changes to the state 0 in FIG. 11. That is, when the redundant thread execution signals 281A and 2813 are continuously output, the state changes to +1, after that, returns to the state 0, and remains unchanged.

In the diagram, the minimum value −N of the state indicates that the instruction execution number in a redundant thread in the CPU core 2A is smaller than that in the CPU core 23 only by N. On the other hand, the maximum value +N of the state indicates that the instruction execution number in a redundant thread in the CPU core 2A is larger than that in the CPU core 2B only by N.

The redundant thread execution control circuit 11 in FIG. 1 is configured so that, as shown in the transition diagram of FIG. 11, when the difference in the instruction execution numbers in redundant threads reaches either the maximum value +N or the minimum value −N, the redundant thread selection inhibition signal 110A or the redundant thread selection inhibition signal 110B is generated. Consequently, when the difference in the instruction execution numbers in execution of a redundant thread reaches the minimum value −N, the redundant thread execution control circuit 11 outputs the redundant thread selection inhibition signal 110B to the CPU core 2B. On the other hand, when the difference in the instruction execution numbers reaches the maximum value N, the redundant thread execution control circuit 11 outputs the redundant thread selection inhibition signal 110A to the CPU core 2A. When the redundant thread selection inhibition signals 110A and 110B are supplied to the CPU cores 2A and 2B, the thread selection circuit 28 in each of the CPU cores does not select a thread assigned to a redundant thread.

(2) State Transition in the Case where N=1

Figure 12:
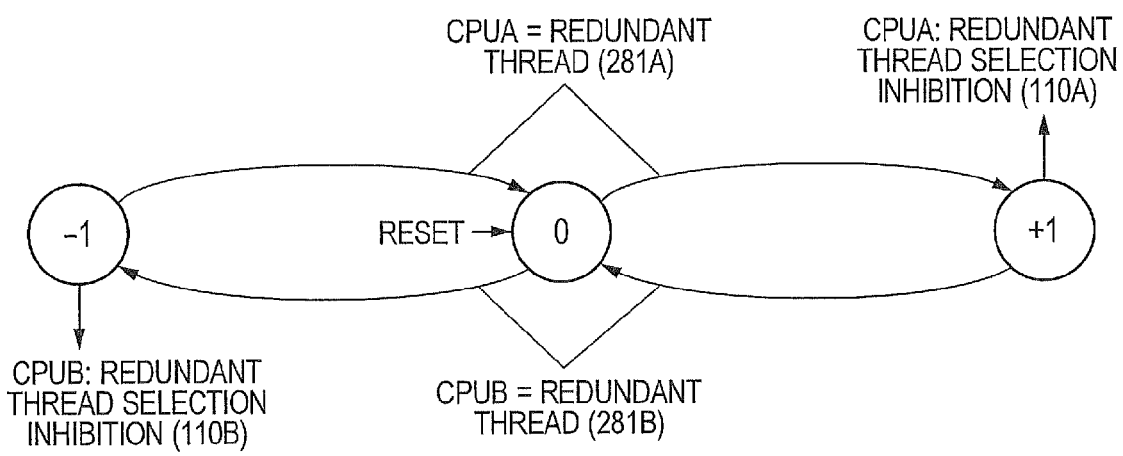
FIG. 12 is a diagram illustrating a state transition of the redundant thread execution control circuit in the first embodiment.

FIG. 12 shows a state transition of an example in which each of the maximum value +N and the minimum value −N is set to 1 in the state transition illustrated in FIG. 11. In this case, when the difference between the numbers of instruction execution times in redundant threads reaches two, the redundant thread selection inhibition signal 110A or the redundant thread selection inhibition signal 110B is output from the redundant thread execution control circuit 11. In such a manner, the number of instruction execution times in a redundant thread in the CPU core 2A and that in the CPU core 2B are regulated to be the same or different from each other only by one. That is, the difference between the numbers of instruction execution times in redundant threads is regulated to one or less.

In such a manner, one stage of the address buffer (AB) 50, one stage of the read data buffer (RDB) 51, and one stage of the write data buffer (WDB) 52 provided in the system bus control circuit 5 illustrated in FIG. 1 are sufficient per thread, so that increase in the circuit area in a semiconductor chip can be suppressed. Since one stage per thread is sufficient, the configuration for suppressing it can be also simplified. Since the redundant thread execution control circuit 11 regulates execution of an instruction in a redundant thread by one of the CPU cores so that the difference between the numbers of instruction execution times in redundant threads becomes a predetermined value or less, it can be also regarded as a regulation circuit.

Figure 21:
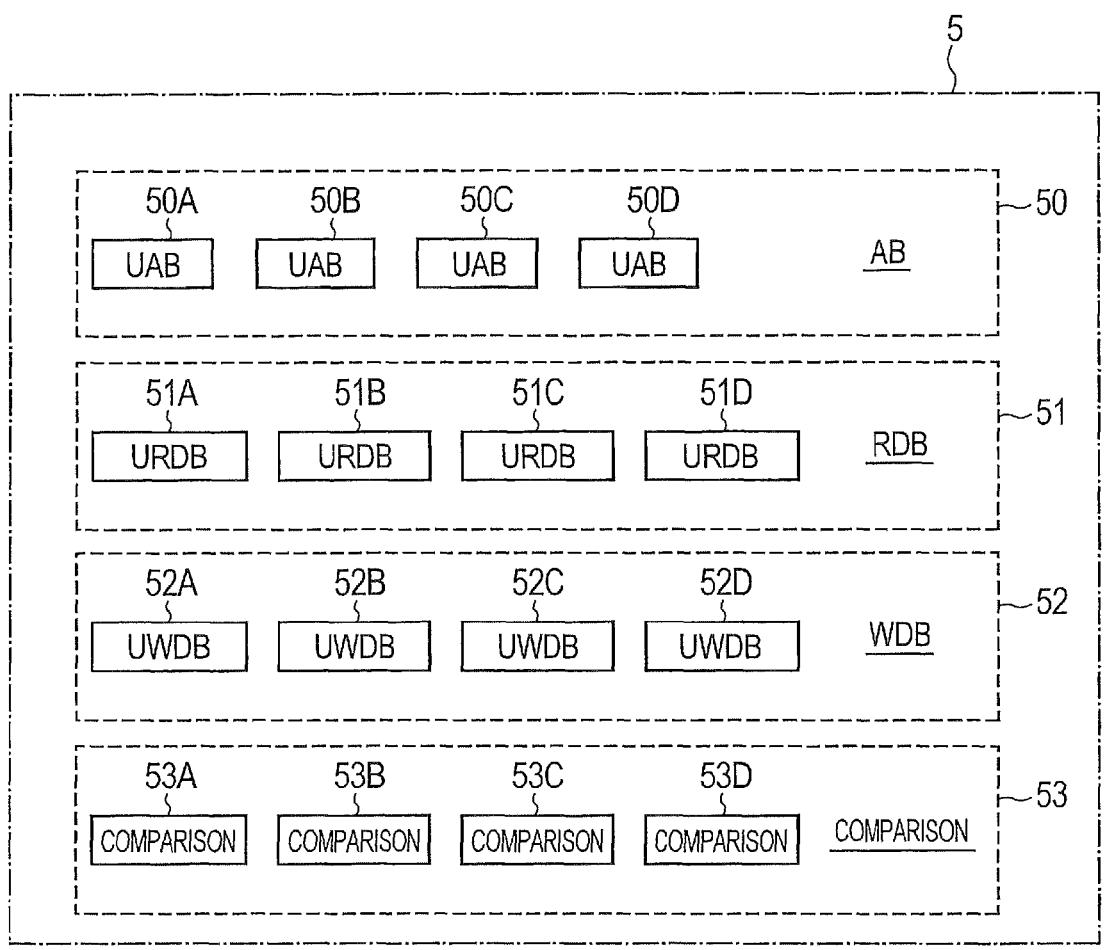
FIG. 21 is an explanatory diagram illustrating the configuration of a register in the first embodiment.

In FIG. 1, for easier understanding, the system bus control circuit 5 includes the address buffer 50, the read data buffer 51, the write data buffer 52, and the comparison circuit 53. More specifically, as illustrated in FIG. 21, each includes a plurality of buffers or comparison circuits. That is, each of the address buffer 50, the read data buffer 51, the write data buffer 52, and the comparison circuit 53 includes unit buffers or comparison circuits corresponding to the number of threads. For example, for the thread number 0, a unit address buffer (UAB) 50A, a unit read data buffer (URDB) 51A, a unit write data buffer (UWDB) 52A, and a unit comparison circuit 53A are provided. Similarly, unit buffers and unit comparison circuits are provided for the other thread numbers 1, 2, and 3.

(3) Operation Example in the Case where N=1

Figure 13:
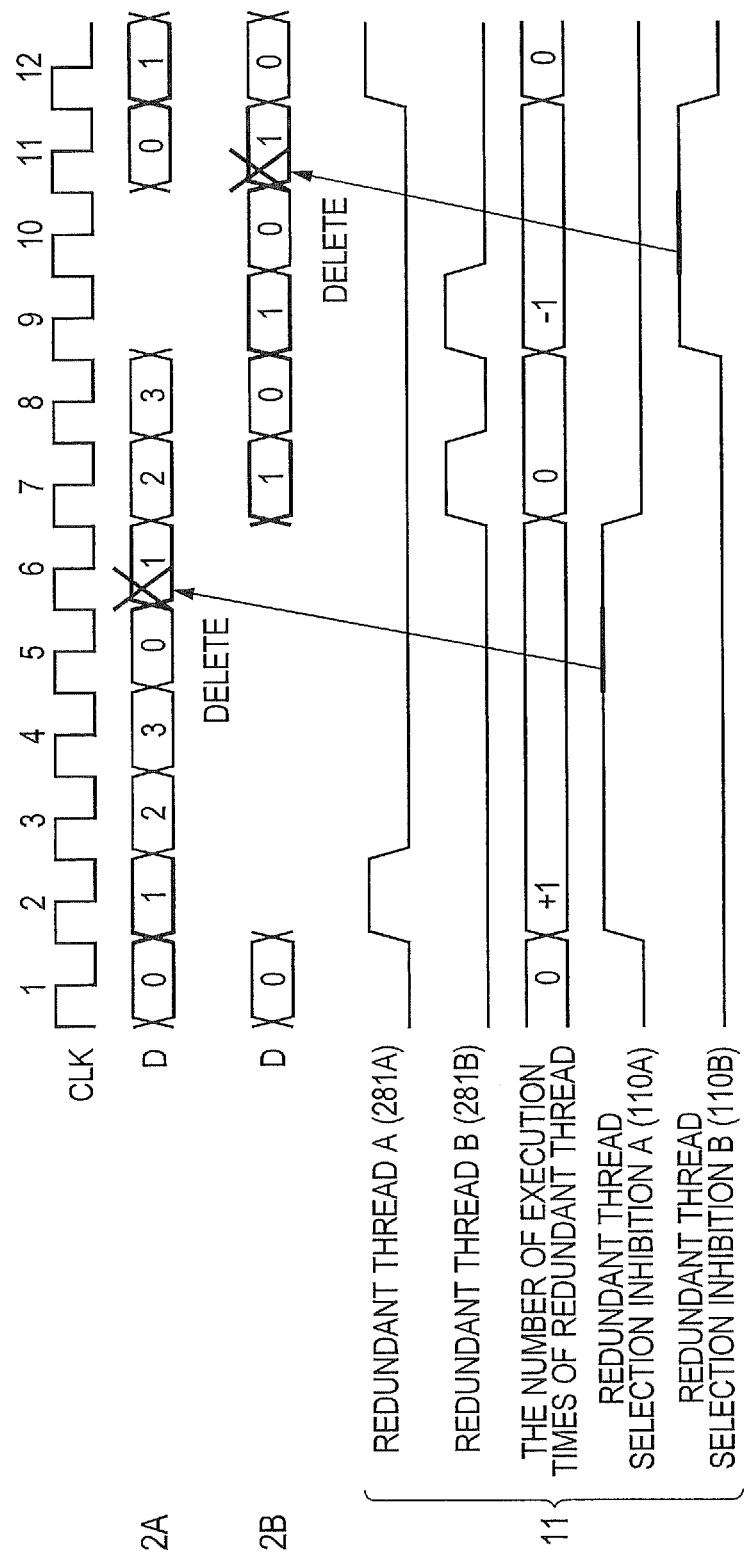
FIG. 13 is a timing chart illustrating the operation of the redundant thread execution control circuit in the first embodiment.

FIG. 13 is a timing chart of the operation of the redundant thread execution control circuit 11 having the function of achieving the state transition illustrated in FIG. 12. In the diagram, alphanumeric characters 2A and 2B correspond to the CPU cores 2A and 2B, and the numeral 11 indicates signals output from the execution control circuit 11 and the numbers of instruction execution times in redundant threads. In the diagram, D denotes the decode stage. Like the other drawings, the number of a thread in a decode stage is also written. As understood also from the drawing, the threads are sequentially executed in order of thread numbers 0 to 3.

The timing chart in FIG. 13 illustrates the case where the thread number 1 of the CPU core 2A and that of the CPU core 2B are redundant threads. It is assumed that the number of execution times of a redundant thread is zero in the beginning. When the CPU core 2A executes an instruction of a redundant thread at CLKNO=2, the redundant thread execution signal (written as "redundant thread A" in FIGS. 13, 14, 16, 17, and 18) 281A is output. The number of redundant thread execution times changes from 0 to 1 in the redundant thread execution control circuit 11, and the redundant thread execution control circuit 11 outputs the redundant thread selection inhibition signal (written as "redundant thread selection inhibition A" in FIGS. 13, 14, 16, 17, and 18) 110A to the CPU core 2A. In CLKNO=6, the thread number 1 (redundant thread) is selected as a thread to be executed in the CPU core 2A. However, since the redundant thread selection inhibition signal 110A is supplied to the CPU core 2A at this time, execution of the thread is inhibited at CLKNO=6. Since execution is inhibited, it can be also regarded that the thread is deleted. That is, by the redundant thread selection inhibition signal 110A, selection of the redundant thread in the following clock cycle is inhibited. Although the redundant thread selection inhibition signal 110A is output also in CLKNO=2 to 6 in the diagram, it does not exert influence on selection of the thread numbers 2, 3, 0, and 2 (non-redundant threads) allocated so as to be executed in CLKNO=3, 4, 5, and 7. It is sufficient to inhibit selection of threads by the redundant thread selection inhibition signal 110A only in the case where information indicative of the redundant thread is set in the TTR 27. In such a manner, since the thread is a redundant thread, selection of the thread number 1 in CLKNO=6 is inhibited.

When the CPU core 2B selects a redundant thread in CLKNO=7, the redundant thread execution signal (written as "redundant thread B" in FIGS. 13, 14, 16, 17, and 18) 281B is output from the CPU core 2B. The redundant thread execution signal 281B is received, the difference between instruction execution numbers in redundant threads in the redundant thread execution control circuit 11 becomes zero, and the redundant thread selection inhibition signal 110A is withdrawn.

Subsequently, when the CPU core 2B selects a redundant thread at CLKNO=9, the difference between instruction execution numbers in redundant threads becomes −1, and the redundant thread selection inhibition signal (written as "redundant thread selection inhibition B" in FIGS. 13, 14, 16, 17, and 18) 110B is output from the redundant thread execution control circuit 11. When the CPU core 2B tries to select the redundant thread of the thread number 1 at CLKNO=11, selection of the thread number 1 at CLKNO=11 is inhibited by the redundant thread selection inhibition signal 110B. The inhibition of the redundant thread by the redundant thread inhibition signal 110B is cancelled when the CPU core 2A selects the thread number 1 at CLKNO=12. Also with respect to the CPU core 2B, like the CPU core 2A, although the redundant thread selection inhibition signal 110B is issued also at CLKNO=10, the thread number 0 is selected and executed.

(4) Example of Modification Operation when N=1

Figure 14:
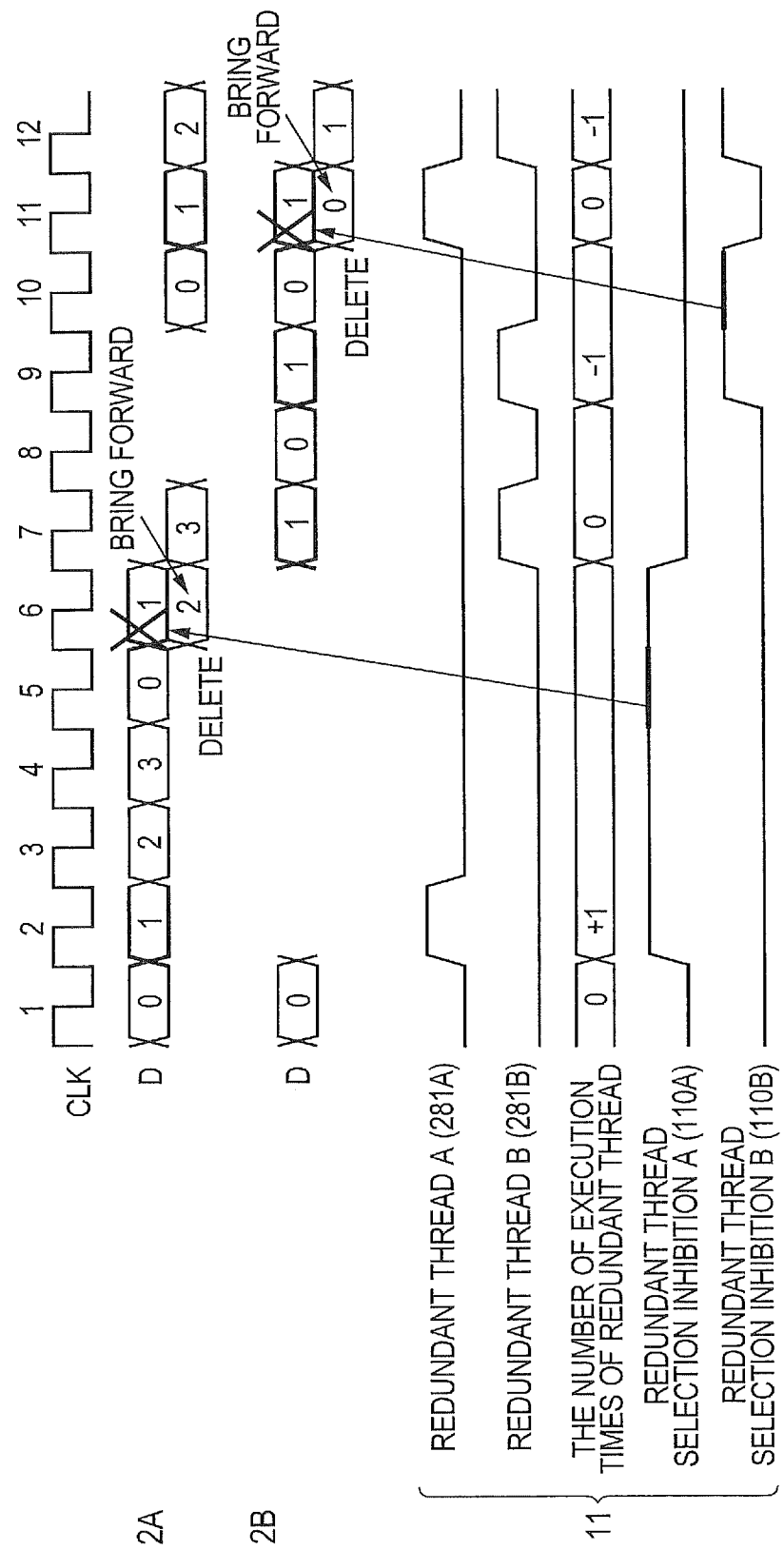
FIG. 14 is a timing chart illustrating the operation of the redundant thread execution control circuit in the first embodiment.

FIG. 14 is another operation timing chart of the redundant thread execution control circuit 11 and the thread selection circuit 28. The redundant thread execution control circuit 11 inhibits selection of the thread number 1 of the CPU core 2A at CLKNO=6. On receipt of the inhibition, the thread selection circuit 28 selects, ahead of schedule, the thread number 2 scheduled to be executed next. Similarly, selection of the thread number 1 of the CPU core 2B is inhibited in CLKNO=11, and the thread number 0 scheduled to be executed next is executed ahead of schedule. In such a manner, an instruction in a non-redundant thread can be executed in a pipeline stage of a redundant thread which is inhibited to be selected, so that the process performance can be improved.

(5) Modification of Redundant Thread Selection Inhibition Signal and Redundant Thread Execution Signal FIG. 1 illustrates an example that each of the CPU cores can execute four threads, and uses one redundant thread selection inhibition signal 110A (110B) and one redundant thread execution signal 281A (281B) for the four threads. Alternately, one redundant thread selection inhibition signal 110A (110B) and one redundant thread execution signal 281A (281B) may be used for one thread. In this case, it is sufficient to provide the state transition illustrated in FIG. 11 or 12 independently for each of the four threads, supply one redundant thread execution signal corresponding to the thread to the state transition (FIG. 11 or 12) provided independently, and supply one redundant thread selection signal to the corresponding thread. In such a manner, the control on each thread can be simplified. For example, when the redundant thread selection signal corresponding to one redundant thread expresses inhibition so as not to select the thread, the redundant thread selection signal corresponding to another thread can permit selection of the thread.

(6) Modification of Redundant Thread Execution Control Circuit

Figure 15:
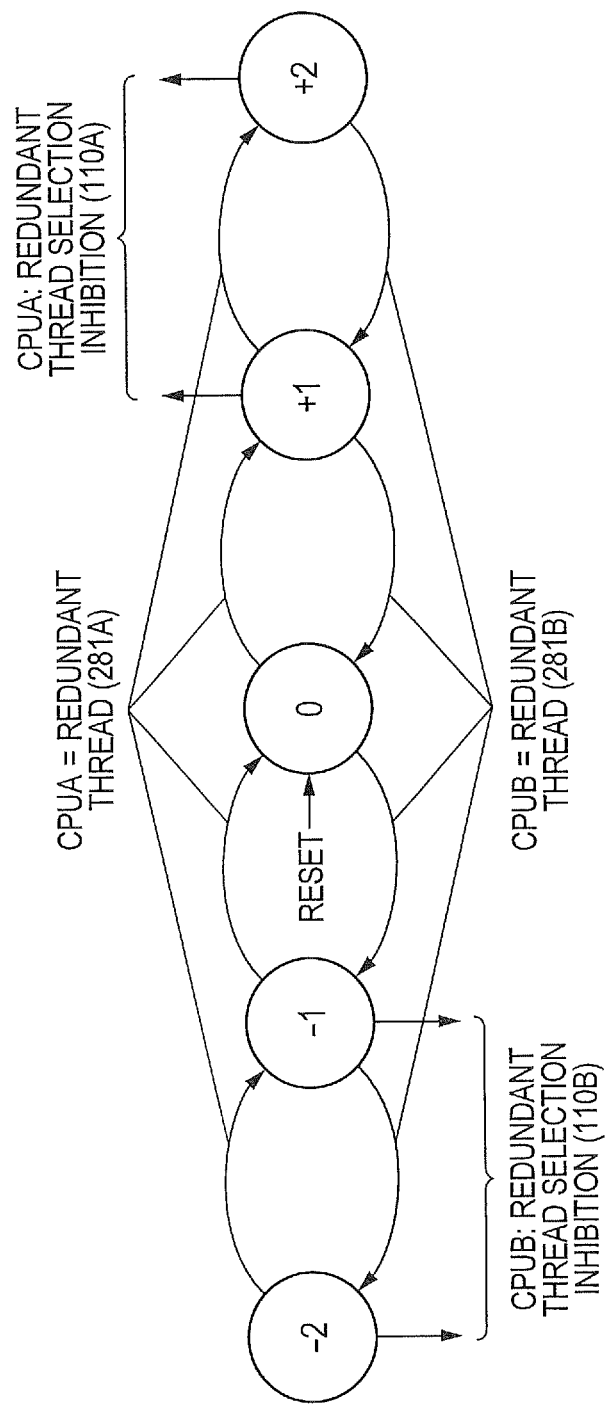
FIG. 15 is a diagram illustrating a state transition of a modification of the redundant thread execution control circuit in the first embodiment.

FIG. 15 illustrates a modification of the redundant thread execution control circuit. The diagram illustrates a state transition in the case of setting the maximum value +N and the minimum value −N to 2 in the state transition of FIG. 11. The number of instruction execution times in the redundant thread of the CPU core 2A and that of the CPU core 2B are the same or different from each other only by one or two. In this case, two stages each of the address buffers 50 (AB), read data buffers 51 (RDB), and write data buffers 52 (WDB) in the system bus control circuit 5 are necessary. When the difference of the numbers of the instruction execution times is not only the minimum value −2 and the maximum value +2 but also −1 and +1, the redundant thread selection inhibition signals 110A and 110B are output. By the redundant thread selection inhibition signals 110A and 110B, selection of the redundant thread after two cycles is inhibited. Since it is sufficient to execute the redundant thread selection inhibition from the redundant thread execution signals 281A and 281B in two cycles, different from the state transition of FIG. 12, circuits necessary to perform the control can be held in stages of two cycles, and occurrence of a critical path as a cause of lowering the operation frequency can be avoided.

Figure 16:
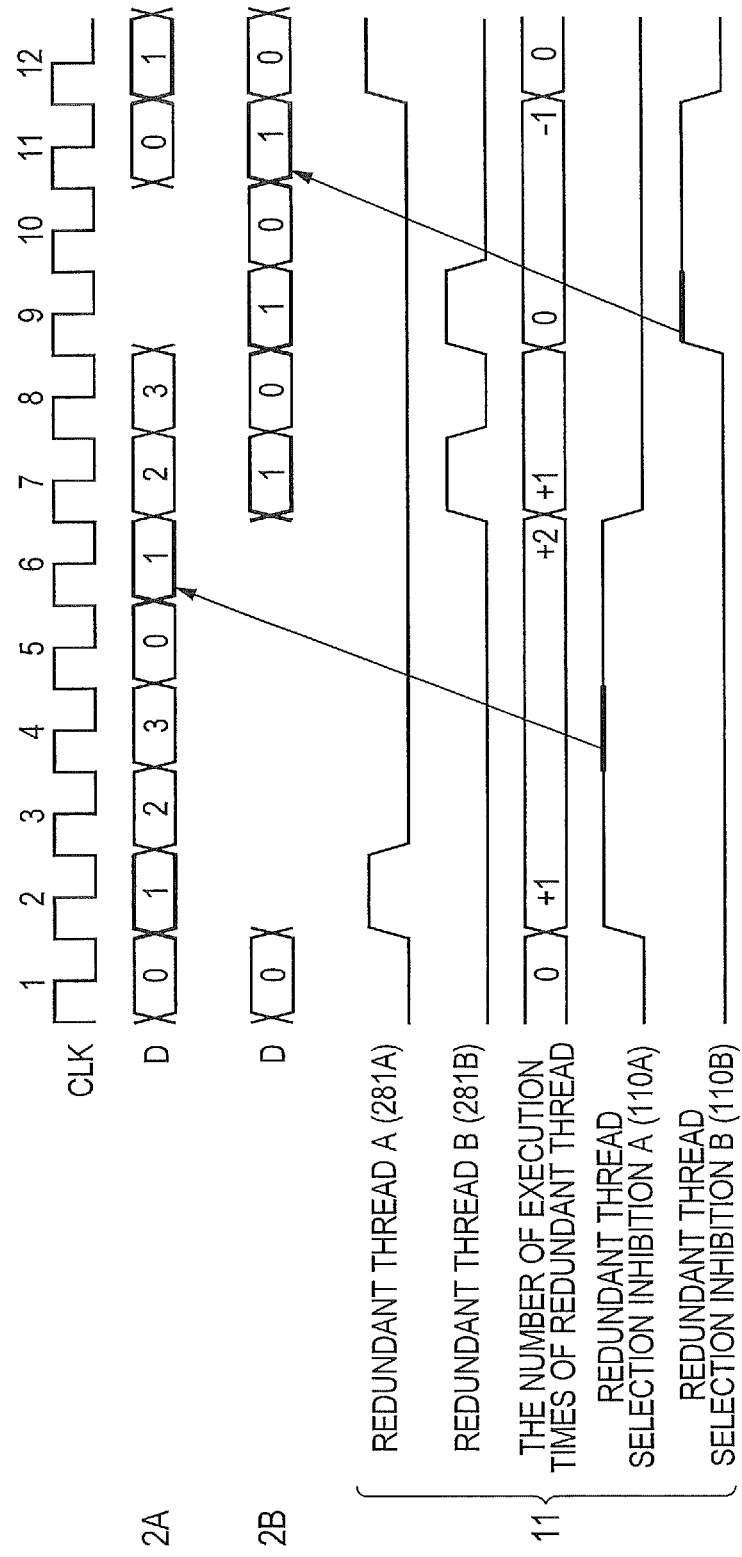
FIG. 16 is a timing chart illustrating the operation of a modification of the redundant thread execution control circuit in the first embodiment.

FIG. 16 is an operation timing chart of the redundant thread execution control circuit 11 realizing the state transition illustrated in FIG. 15. As understood by comparison with the timing chart of FIG. 13, in the example illustrated in FIGS. 15 and 16, selection of the redundant thread after two cycles is inhibited by the redundant thread selection inhibition signals 110A and 110B. FIG. 16 illustrates that execution of the thread is not inhibited also at CLKNO=6 in which the redundant thread selection inhibition signal 110A is output.

Figure 17:
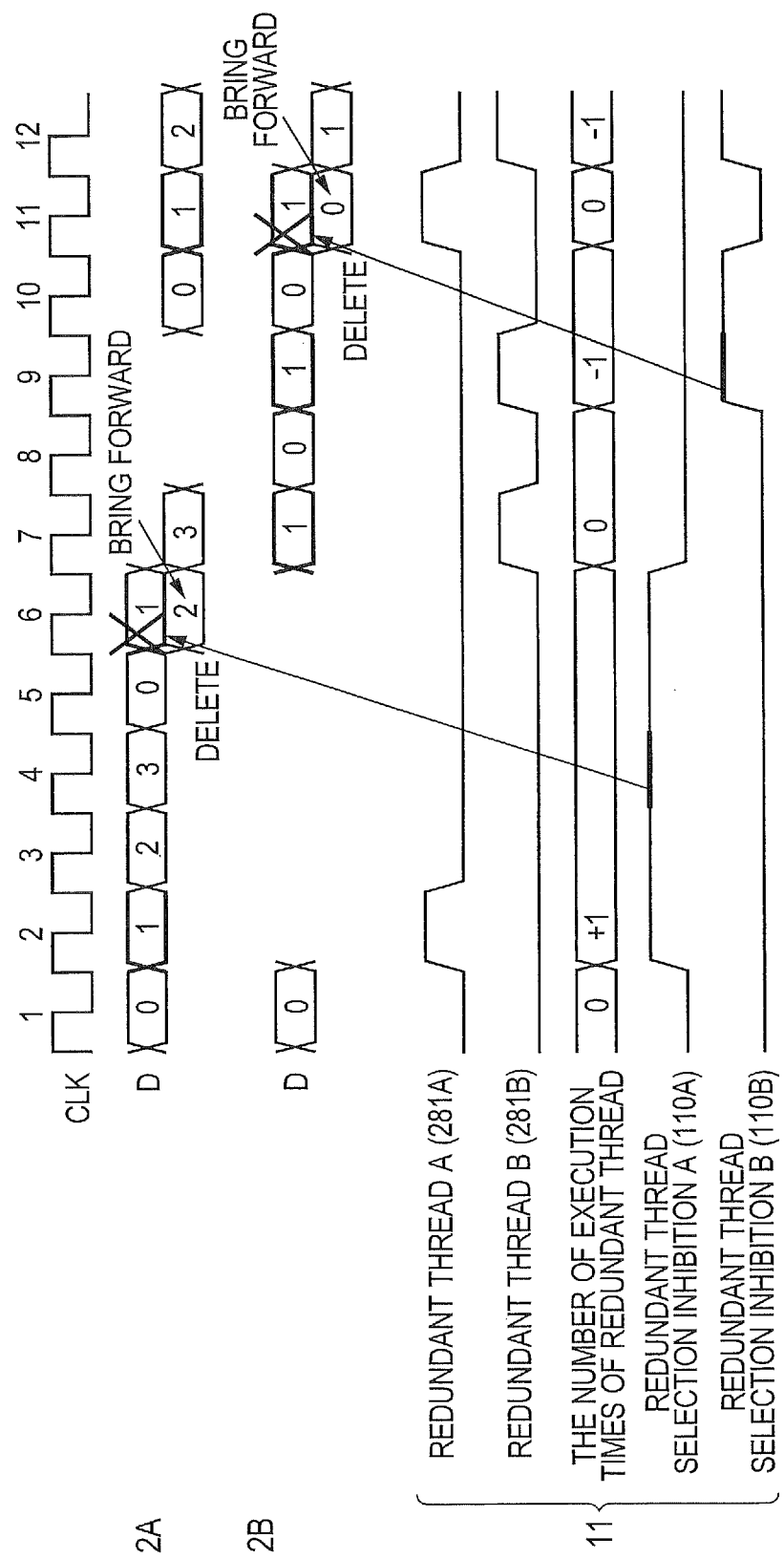
FIG. 17 is a timing chart illustrating the operation of a modification of the redundant thread execution control circuit in the first embodiment.

FIG. 17 is another operation timing chart of the redundant thread execution control circuit 11 and the thread selection circuit 28. As understood from the description of the operation timing chart of FIG. 14, in a stage in which selection of a redundant thread is inhibited, a thread scheduled to be executed next is executed ahead of schedule.

(7) Case where Exception Occurs in Redundant Thread

Figure 18:
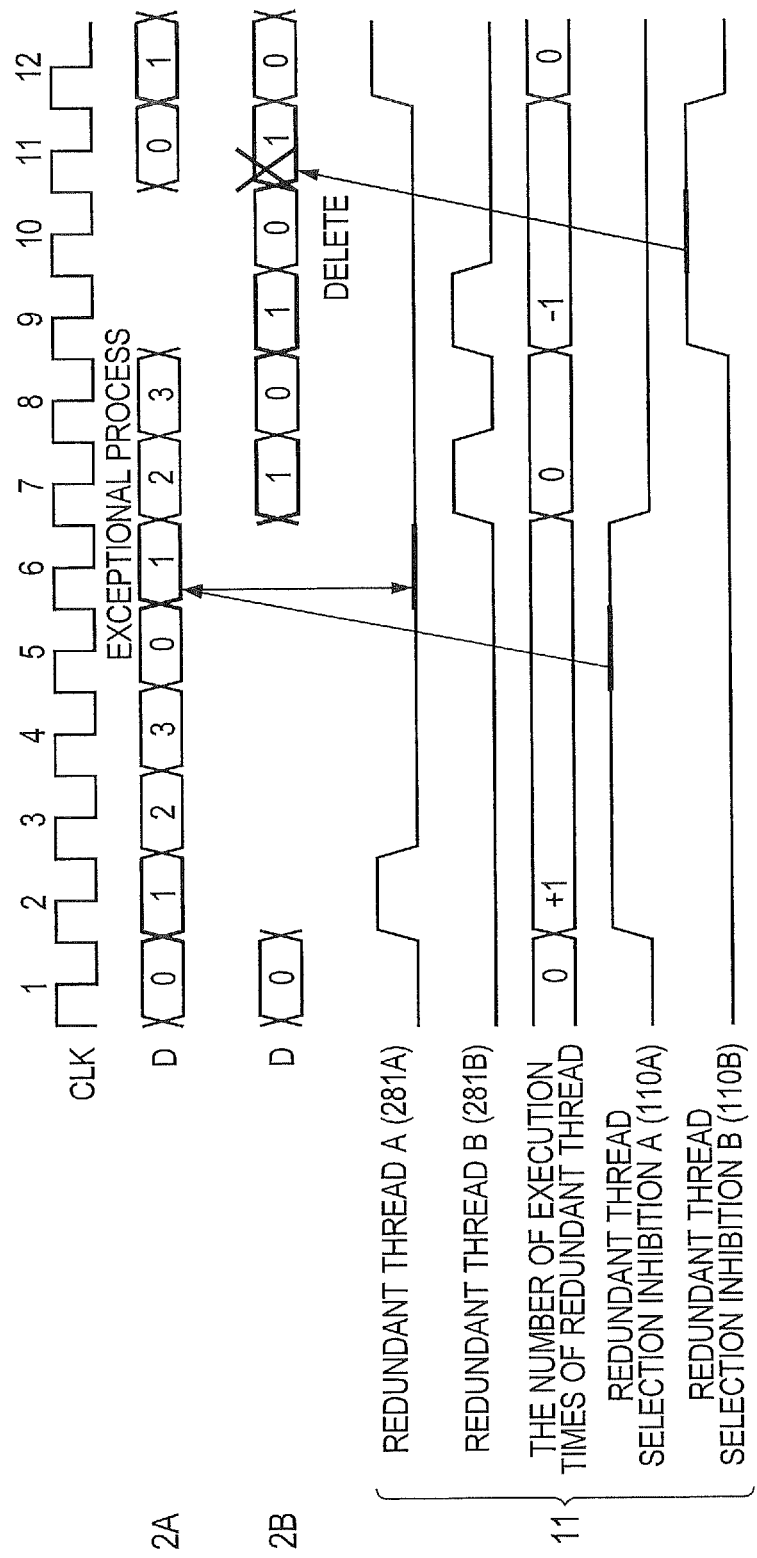
FIG. 18 is a timing chart illustrating the operation when an exception occurs in the redundant thread execution control circuit in the first embodiment.

FIG. 18 is an operation timing chart of the redundant thread execution control circuit 11 in the case where an exception occurs in a redundant thread. Examples of an exception include an undefined instruction, zero divide (divided by zero in execution of a division instruction) and a memory error (occurrence of an error in a test at the time of reading in a memory to which test information such as a parity or ECC is added). Occurrence of an exception depends on a CPU core. Consequently, even when an exception occurs during execution of a redundant thread, an exception process for the exception is executed only by the CPU core in which the exception occurs. It is now assumed that an exception occurs in thread number 1 (redundant thread) at CLKNO=2 and the thread number 1 at CLKNO=6 is an exception process. Since a redundant thread is selected at CLKNO=2, the number of instruction execution times in the redundant thread becomes +1, and selection of a redundant thread is inhibited in the CPU core 2A (refer to the description of FIG. 13). Since the exception process is a process executed in one of the CPU cores, the thread is regarded as a non-redundant thread, not a redundant thread in which the same process is performed in a plurality of threads, and is executed. That is, the thread in CLKNO=6 is a redundant thread, and the exception process is executed in the thread in CLKNO=6. Since it is the exception process, the setting of the TTR 27 is not changed, and the redundant thread execution signal 281A is not output. After the exception process is finished, the thread number 1 is executed as a redundant thread in CLKNO=12, and the redundant thread execution signal 281A is output. In such a manner, the redundant thread exception process can be executed. Even when an exception occurs, diagnosis can be conducted. Although the exception process is finished in one cycle in FIG. 18, there is also a case that a plurality of cycles is necessary to finish the process. In this case, the thread in CLKNO=12 is regarded as a non-redundant thread, and the exception process is executed.

(8) Case where Exception Occurs in Redundant Thread

Figure 19:
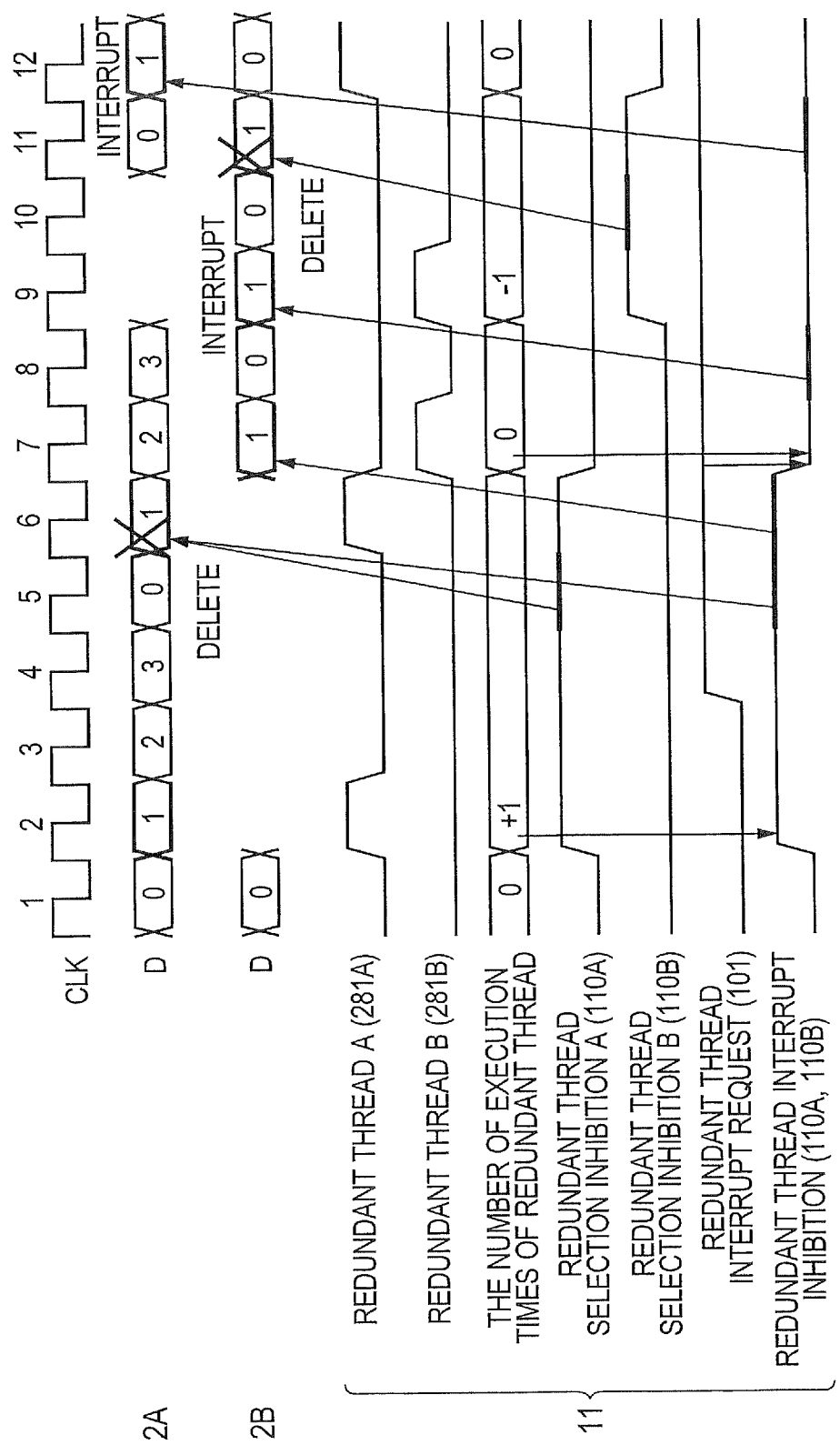
FIG. 19 is a timing chart illustrating the operation when an interruption occurs in the redundant thread execution control circuit in the first embodiment.

FIG. 19 is an operation timing chart of the redundant thread execution control circuit 11 in the case where an interruption occurs in a redundant thread. There are interruptions such as interruptions from peripheral modules such as an A/D converter (peripheral module 8A) and a timer (peripheral module 8Z) and an interruption from an external terminal of the microcontroller 1. To make the interrupting operation executed in redundant threads of the CPU cores 2A and 2B, an interrupt request is received when the instructions in the CPU cores 2A and 2B become the same. To execute such selection and control of a redundant thread, the redundant thread execution control circuit 11 is provided with a control circuit executing the following operation. The redundant thread interruption inhibition signals (written as "redundant thread interruption inhibition" in FIG. 19) 110A and 110B output from the redundant thread execution control circuit 11 are formed on the basis of the difference of the numbers of instruction execution times in redundant threads and the redundant thread interruption request signal (written as "redundant thread interrupt, request" in FIG. 19) 101. Specifically, when the difference between the numbers of instruction execution times=0 and the redundant thread interrupt request signal 101=0, the redundant thread interruption inhibition signals 110A and 110B become zero. When the difference between the numbers of instruction execution times≠0 and the redundant thread interruption request signal 101=0, the redundant thread interruption inhibition signals 110A and 110B become 1. When the difference between the numbers of instruction execution times=0 and the redundant thread interruption request signal 101=1, the redundant thread interruption inhibition signals 110A and 110B become 0 and the CPU cores 2A and 2B become capable of receiving an interruption in a redundant thread. After that, the redundant thread interruption inhibition signals 110A and 110B maintain the state of zero until the redundant interruption request signal 101 becomes zero.

With the configuration, when the CPU core 2A selects a redundant thread in CLKNO=2 and the number of instruction execution times in the redundant thread becomes +1, the redundant thread interrupt inhibition signals 110A and 110B are output (become one). In CLKNO=4, although the interrupt request signal 101 in the redundant thread is output from the interrupt controller 10, since the difference of the numbers of instruction execution times is not zero, the interruption is not accepted. When the CPU core 2B selects a redundant thread in CLKNO=7, the difference of the numbers of instruction execution times in the redundant thread becomes zero, and the redundant thread execution control circuit 11 withdraws the redundant thread interrupt inhibition signals 110A and 110B (sets the signals to zero). By withdrawal of the redundant thread interrupt inhibition signals 110A and 110B, the CPU core 2B selects a redundant thread in CLKNO=9 and accepts interruption. On the other hand, in CLKNO=12, the CPU core 2A selects a redundant thread and accepts interruption. In such a manner, the interruption can be accepted in the redundant thread by the same instruction. Also in the case where interruption occurs, diagnosis can be conducted.

Second Embodiment

Figure 20:
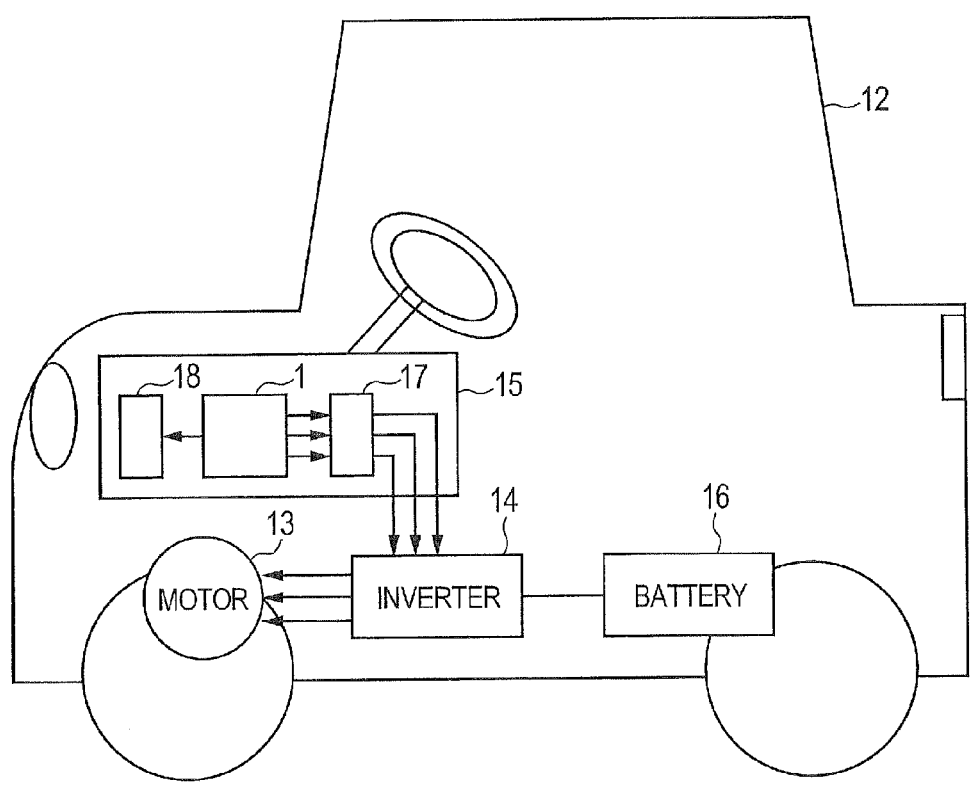
FIG. 20 is a block diagram illustrating a system in a second embodiment.

FIG. 20 illustrates an example of a system using the microcontroller described in the first embodiment. The example relates to a vehicle using an electronic control unit including a multithreading microcontroller having a failure detecting function. In a vehicle 12, the microcontroller 1 illustrated in FIG. 1 is mounted in an electronic control unit 15 controlling a motor 13. An output from a timer (peripheral module 8Z) as a peripheral module provided for the microcontroller 1 is amplified by a driver 17, and the amplified output drives the motor 13 via an inverter 14. When the failure detecting function of the microcontroller 1 detects abnormality in a CPU core, a safety device 18 provided in the electronic control unit 15 is operated from an external terminal provided for the microcontroller 1. The configuration of the safety device 18 may be, although depending on the vehicle as a system, for example, an alarm indicative of a failure in, for example, a dashboard. There is also a method of stopping the timer of the microcontroller 1 which drives the inverter 14. There is further another method of duplexing the microcontroller 1 to make the same process executed and configuring the electronic control unit 15 so as to be able to switch an output of the timer to the driver 17. Although not limited, in the diagram, the battery 16 supplies power to the inverter 14.

Although the invention achieved by the inventors of the present invention has been concretely described on the basis of the embodiments, obviously, the invention is not limited to the embodiments but can be variously changed without departing from the gist.

What is claimed is:

1. A semiconductor integrated circuit device which executes a plurality of threads each as a software execution unit while switching the threads synchronously with clocks, comprising:
    a first register set used for execution of a first thread in the threads;
    a second register set used for execution of a second thread different from the first thread; and
    a comparison circuit for comparing a result of execution of the first thread and a result of execution of the second thread when the first and second threads are execution units of the same specific software and when a redundant thread signal indicates that a redundant thread is being executed in the first and second register sets,
    wherein the first and second register sets are different register sets; and
    wherein remaining register sets of said semiconductor integrated circuit have no active redundant thread signal, thereby comprising execution units of unique software and thereby serving to execute non-redundant threads for which there are no result comparisons between threads.

2. The semiconductor integrated circuit device according to claim 1, further comprising a third register for designating the first and second threads, from the plurality of threads, to be execution units of the same specific software.

3. The semiconductor integrated circuit device according to claim 2, further comprising a first limit circuit for limiting execution of the first or second thread so that the difference between the number of instruction execution times in the first thread and the number of instruction execution times in the second thread becomes a predetermined value.

4. The semiconductor integrated circuit device according to claim 3, further comprising a second limit circuit for limiting execution of the second thread when an exception occurs in execution of the first thread.

5. The semiconductor integrated circuit device according to claim 3, wherein when an interrupt request is generated in execution of the first thread, in the case where the number of instruction execution times in the first thread and that in the second thread have a predetermined relation, the interrupt request is received.

6. The semiconductor integrated circuit device according to claim 1, wherein the first and second threads are executed by a same CPU core.

7. The semiconductor integrated circuit device according to claim 1, wherein the first thread is executed by a first CPU core, and the second thread is executed by a second CPU core different from the first CPU core.

8. A system comprising the semiconductor integrated circuit device according to claim 1.

9. The semiconductor integrated circuit device according to claim 1, wherein only one pair of register sets selectively executes a redundant thread and remaining register sets execute non-redundant threads, thereby providing a mechanism for detecting failures while preserving processing efficiency.

10. The semiconductor integrated circuit device according to claim 1, wherein the comparison circuit is incorporated in a system bus control circuit and the comparison circuit compares at least one of an address and data for a memory access by the first and second threads.

11. The semiconductor integrated circuit device according to claim 1, wherein a selection of which two register sets is used for executing a redundant thread and which thread is executed as a redundant thread is controlled by values stored in registers and wherein values stored in said registers is determined by executing a program to calculate values to be set in said registers.

12. A semiconductor integrated circuit device which operates a plurality of threads each as a software execution unit, two threads out of the threads being specific software for accessing a memory, the semiconductor integrated circuit comprising:
    a first buffer for storing an address on a memory access for a first thread;
    a second buffer for storing read data obtained by a memory access; and
    a first comparison circuit for comparing an address on a memory access for a second thread with the address stored in the first buffer,
    wherein in the case where a read access to the memory is performed in a first thread out of the two threads, the address on the read access is stored in the first buffer,
    wherein, in the case where a read access to the memory is performed in a second thread out of the two threads, an address on the memory access in the second thread and the address stored in the first buffer are compared by the first comparison circuit and,
    wherein, in response to a mismatch from the first comparison circuit, a process corresponding to a failure is performed.

13. The semiconductor integrated circuit device according to claim 12, wherein read data stored in the second buffer is set as read data according to a read access in the second thread in response to a match from the first comparison circuit.

14. The semiconductor integrated circuit device according to claim 13, further comprising:
- a third buffer for storing data to be written in a memory by the first thread; and
- a second comparison circuit for comparing data to be written in a memory by the second thread with data stored in the third buffer,
- wherein in the case where a write access to the memory is performed in the first thread, an address on the write access is stored in the first buffer and data to be written is stored in the third buffer,
- wherein, in the case where a write access to the memory is performed in the second thread, the address and the address stored in the first buffer are compared by the first comparison circuit, data to be written and data stored in the third buffer are compared by the second comparison circuit and,
- wherein, in response to a mismatch from at least one of the first and second comparison circuits, a process corresponding to a failure is performed.

15. The semiconductor integrated circuit device according to claim 14, wherein in response to a match from the first and second comparison circuits, data stored in the third buffer is written in an address in the memory according to the address stored in the first buffer.

16. The semiconductor integrated circuit device according to claim 12, wherein the first and second threads are executed by a single CPU core.

17. A semiconductor integrated circuit device which operates while switching a plurality of threads each as a software execution unit, two threads out of the threads being same software for accessing a memory, the semiconductor integrated circuit device comprising:
- a first buffer for storing an address on a memory access by a first thread;
- a third buffer for storing data to be written in the memory by the first thread;
- a first comparison circuit for comparing an address on a memory access by a second thread with the address stored in the first buffer; and
- a second comparison circuit for comparing data to be written in a memory by the second thread with data stored in the third buffer,
- wherein in the case where a write access to the memory is performed in a first thread out of the two threads, the address on the write access is stored in the first buffer and data to be written is stored in the third buffer,
- wherein, in the case where a write access to the memory is performed in a second thread out of the two threads, an address of the write access to the memory in the second thread and the address stored in the first buffer are compared by the first comparison circuit, the data to be written and write data stored in the third buffer are compared by the second comparison circuit and,
- wherein, in response to a mismatch from at least one of the first and second comparison circuits, a process corresponding to a failure is performed.

18. The semiconductor integrated circuit device according to claim 17, wherein in response to a match from the first and second comparison circuits, the data to be written which is stored in the third buffer is written in the address in the memory according to the write address stored in the first buffer.

19. The semiconductor integrated circuit device according to claim 17, wherein the first and second threads are executed by the same CPU core.

* * * * *